US011973678B2

(12) United States Patent
Lauer et al.

(10) Patent No.: US 11,973,678 B2
(45) Date of Patent: Apr. 30, 2024

(54) CAPTIVE PORTAL POP UP SUPPRESSION

(71) Applicant: GOGO BUSINESS AVIATION LLC, Broomfield, CO (US)

(72) Inventors: Bryan Adrian Lauer, Chicago, IL (US); Rukmani Loganathan, Bartlett, IL (US)

(73) Assignee: GOGO BUSINESS AVIATION LLC, Broomfield, CO (US)

( * ) Notice: Subject to any disclaimer, the term of this patent is extended or adjusted under 35 U.S.C. 154(b) by 0 days.

(21) Appl. No.: 16/656,932

(22) Filed: Oct. 18, 2019

(65) Prior Publication Data

US 2021/0119898 A1 Apr. 22, 2021

(51) Int. Cl.
| | |
|---|---|
| *H04L 43/12* | (2022.01) |
| *H04L 9/40* | (2022.01) |
| *H04L 67/02* | (2022.01) |
| *H04L 67/10* | (2022.01) |

(52) U.S. Cl.
CPC .......... *H04L 43/12* (2013.01); *H04L 63/1466* (2013.01); *H04L 67/02* (2013.01); *H04L 67/10* (2013.01)

(58) Field of Classification Search
CPC ..... H04L 43/12; H04L 63/1466; H04L 67/02; H04L 67/10
See application file for complete search history.

(56) References Cited

U.S. PATENT DOCUMENTS

| | | | |
|---|---|---|---|
| 9,294,920 B2 | 3/2016 | Han et al. | |
| 2009/0249484 A1* | 10/2009 | Howard | H04L 63/1441 726/22 |
| 2010/0235895 A1* | 9/2010 | Grassley | H04W 12/068 726/7 |
| 2013/0111024 A1 | 5/2013 | Setia et al. | |
| 2013/0275384 A1* | 10/2013 | Sivasubramanian | H04L 51/18 707/664 |
| 2015/0131519 A1* | 5/2015 | Kanabar | H04W 4/14 370/315 |
| 2015/0373518 A1* | 12/2015 | Difrancesco | H04H 20/59 455/404.1 |

(Continued)

FOREIGN PATENT DOCUMENTS

| | | |
|---|---|---|
| CN | 1753364 A | 3/2006 |
| CN | 104469979 A | 3/2015 |

(Continued)

OTHER PUBLICATIONS

International Application No. PCT/US2020/054988, International Search Report and Written Opinion, dated Jan. 22, 2021.

*Primary Examiner* — William G Trost, IV
*Assistant Examiner* — Abdelbasst Talioua
(74) *Attorney, Agent, or Firm* — MARSHALL, GERSTEIN & BORUN LLP; Randall G. Rueth

(57) ABSTRACT

Systems and methods may provide connectivity to client electronic devices in a wireless communication network aboard aircraft or in another environment. During initial client device association with the wireless network, captive browser use at the client device may be minimized by directing the device to a fully-capable browser. Upon association, subsequent captivity probes transmitted by the client device may be detected and handled so as to prevent undesired re-launching of the captive browser at the client device.

16 Claims, 12 Drawing Sheets

(56) References Cited

U.S. PATENT DOCUMENTS

| | | | | |
|---|---|---|---|---|
| 2016/0014660 A1* | 1/2016 | Bar | ............... | H04W 12/08 |
| | | | | 455/439 |
| 2016/0315856 A1* | 10/2016 | Tewari | ............... | H04L 67/52 |
| 2017/0222900 A1* | 8/2017 | Kaal | ............... | H04L 43/0811 |
| 2017/0346853 A1* | 11/2017 | Wyatt | ............... | H04W 12/122 |
| 2018/0309757 A1* | 10/2018 | Schonwald | ......... | H04L 63/0884 |
| 2018/0324144 A1* | 11/2018 | Shi | ............... | H04L 12/4641 |
| 2019/0215330 A1* | 7/2019 | Neuvirth | ............ | H04L 63/1425 |
| 2020/0021989 A1* | 1/2020 | Smith | ............... | H04W 48/20 |
| 2020/0145414 A1* | 5/2020 | Romero | ............... | G06F 21/35 |

FOREIGN PATENT DOCUMENTS

| | | |
|---|---|---|
| CN | 104756459 A | 7/2015 |
| CN | 106789937 A | 5/2017 |
| GB | 2540336 A | 1/2017 |
| WO | WO-2014028291 A2 | 2/2014 |

\* cited by examiner

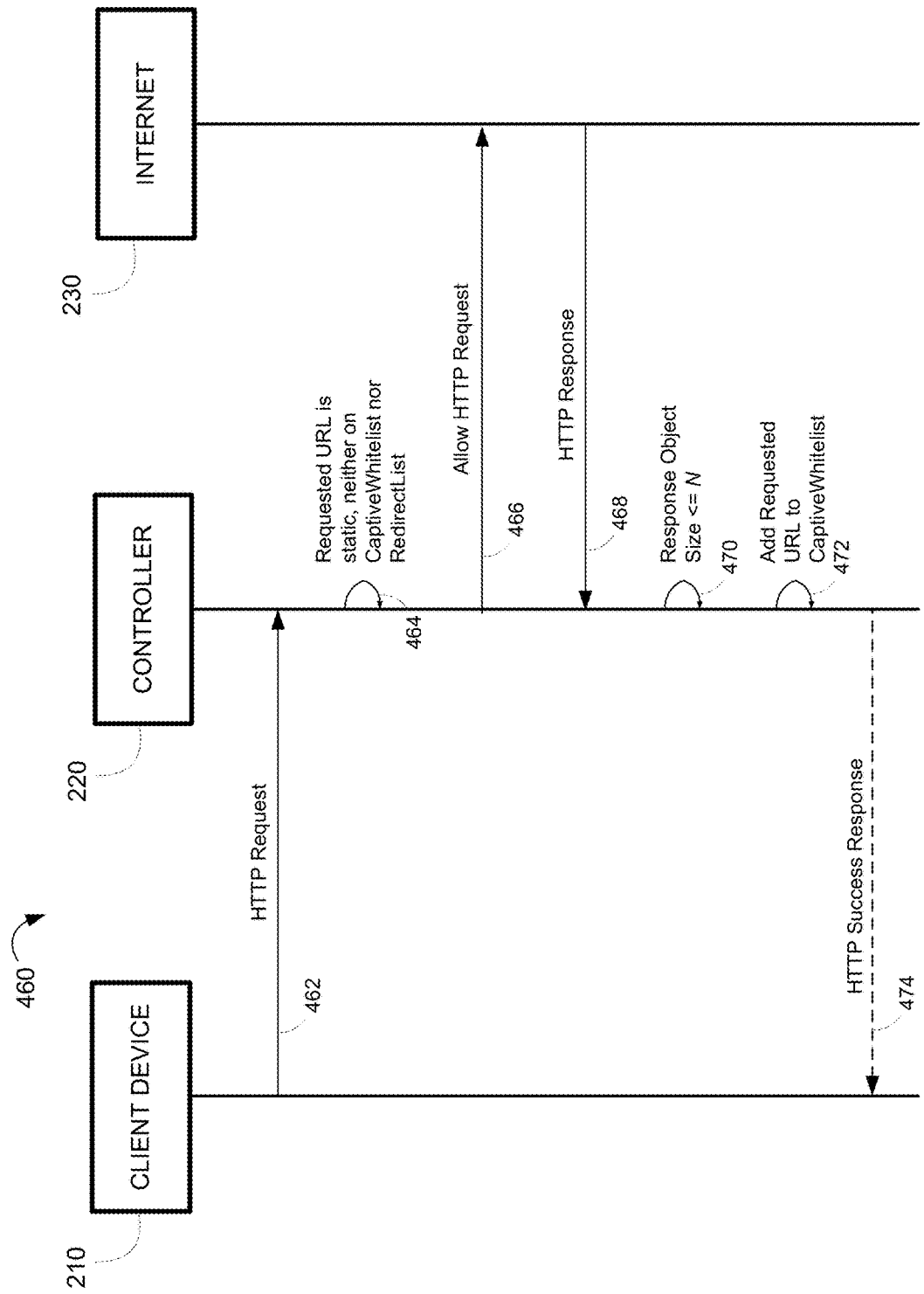

CAPTIVE PORTAL POP UP SUPPRESSION

FIELD

The present disclosure generally relates to providing connectivity for client electronic devices in a wireless communication environment, and more particularly to handling communications received via client electronic devices to prevent interruptions of a visitor-based communication service.

BACKGROUND

Generally, client electronic devices, such as mobile smartphones, tablets, laptops and the like, can connect to wireless communication networks implemented in a variety of environments. These environments may include those in which the client devices are temporarily located or "visiting," these environments including vehicles (e.g., aircraft), restaurants, hotels, and transit centers. In such environments, a connectivity provider often provides a "visitor-based communication service" that provide client devices with limited, temporary access to the Internet. In some of these environments, particularly aircraft in transit, the visitor-based communication service may be the only means available for client devices to access the Internet via the World Wide Web, and thus requiring the client device to utilize the visitor-based communication service.

Typically, to access a visitor-based communication service, a client device may access a "captive portal" (e.g., one or more web pages) via which the client electronic device may provide authentication, provide payment, accept of use policy, and/or perform other actions prerequisite to being granted complete access to the visitor-based communication service. Once those actions are completed, the client device can temporarily access a limited "whitelisted" set of websites/services available via the visitor-based communication service. Insofar as some websites/services are not whitelisted, any request to access those websites/services using Hypertext Transfer Protocol (HTTP) requests may be redirected to the allowed set of websites/services (the "visitor-service portal").

Often, a client device is brought to the captive portal when the client device transmits an "HTTP captivity probe," which many client devices transmit automatically as a means of detecting network captivity. Normally, when a response to the probe indicates captivity (e.g., an "HTTP redirect" response is received), the client device automatically launches a limited-capability Web browser of the client device known as a "captive browser," with the captive portal being presented therein. Via the captive portal presented in this captive browser, it is intended that the client device be able to complete any prerequisite actions, and thereby gain permission to use the visitor-based communication service to access the Internet via the Web.

However, in some circumstances, the capabilities of the captive browser are so limited that the captive browser cannot properly load and execute the captive portal. Thus, a client device can be unintentionally impeded from accessing the visitor-based communication service, which in many circumstances prevents the client device from accessing the only means of connectivity available in the device's environment. Moreover, even once a client device has gained access to the visitor-based communication service, any further HTTP captivity probes transmitted by the client device may, if not already included among whitelisted websites/services, automatically be redirected, causing re-launching of the captive browser at the client device, potentially causing the same access problems and causing inconvenience to a user.

SUMMARY

The disclosure of the present application describes computing systems and methods for providing Internet connectivity to client electronic devices aboard aircraft or in other environments that utilize a visitor-based communication service. At a high level, upon initial client device association with a wireless network in the environment, an HTTP captivity probe transmitted by the client device may be redirected, causing the client device to launch a captive browser to access a captive portal of the visitor-based communication service. Instead of asking or requiring that the client device perform prerequisite actions in the captive browser, the loaded captive portal may indicate that the client device should open a different, "fully-capable" browser of the client device to proceed toward accessing the visitor-based service. Via the fully-capable browser, the client device may perform any prerequisite actions in the captive portal, and may proceed to access websites and services offered by the visitor-based communication service.

Furthermore, upon a client device accessing the visitor-based communication service, further HTTP request traffic from the client device may be automatically monitored and handled to prevent further interruption to the visitor-based communication service. Particularly, HTTP request traffic corresponding to known HTTP captivity probes may be automatically "allowed" through the visitor-based communication service (i.e., without redirect), thereby preventing a response to the client device that would cause the client device to re-launch its captive browser and interrupt access to the visitor-based communication service. In some embodiments, machine learning techniques may be utilized to automatically identify the various HTTP captivity probes utilized by various client devices, which may change over time.

In an embodiment, a computer-implemented method is provided. The computer-implemented method may include (1) obtaining, via one or more processors, first and second lists of uniform resource identifiers, the first list of uniform resource identifiers corresponding to HTTP requests that are captivity probes utilized by client electronic devices to detect network captivity, and the second list of uniform resource identifiers corresponding to HTTP requests that are not captivity probes, (2) receiving, via the one or more processors, via a client electronic device over the wireless communication network, an HTTP request comprising a uniform resource identifier, (3) determining, via the one or more processors, one or more textual characteristics of the uniform resource identifier, (4) determining, via the one or more processors, whether the uniform resource identifier is included in the first or the second list of uniform resource identifiers, and/or (5) based upon the one or more textual characteristics, and further based upon whether the resource uniform resource identifier is included in the first or second list of uniform resource identifiers, transmit, via the one or more processors, one or more messages to the client electronic device or to a destination via the Internet, the destination indicated by the HTTP request received via the client electronic device. The method may include additional, fewer, or alternate actions, including those described herein.

In another embodiment, a controller device is provided. The controller device may include one or more processors, and one or more memories storing non-transitory computer executable instructions that, when executed via the one or more processors, cause the controller device to (1) obtain first and second lists of uniform resource identifiers, the first list of uniform resource identifiers corresponding to H captivity probes utilized by client electronic devices to detect network captivity, and the second list of uniform resource identifiers corresponding to HTTP requests that are not HTTP captivity probes, (2) receive, via a client electronic device over the wireless communication network, an HTTP request comprising a uniform resource identifier, (3) determine one or more textual characteristics of the uniform resource identifier, (4) determine whether the uniform resource identifier is included in the first or the second list of uniform resource identifiers, and/or (5) based upon the one or more textual characteristics, and further based upon whether the resource uniform resource identifier is included in the first or second list of uniform resource identifiers, transmit one or more messages to the client electronic device or to a destination via the Internet, the destination indicated by the HTTP request received via the client electronic device. The controller device may include additional, fewer, or alternate computing elements or instructions, including those described herein.

In still another embodiment, one or more non-transitory computer-readable media are provided. The one or more non-transitory computer readable media store non-transitory computer executable instructions that, when executed via the one or more processors, cause the one or more processors to (1) obtain first and second lists of uniform resource identifiers, the first list of uniform resource identifiers corresponding to Hypertext Transfer Protocol (HTTP) captivity probes utilized by client electronic devices to detect network captivity, and the second list of uniform resource identifiers corresponding to HTTP requests that are not HTTP captivity probes, (2) receive, via a client electronic device over the wireless communication network, an HTTP request comprising a uniform resource identifier, (3) determine one or more textual characteristics of the uniform resource identifier, (4) determine whether the uniform resource identifier is included in the first or the second list of uniform resource identifiers, and/or (5) based upon the one or more textual characteristics, and further based upon whether the resource uniform resource identifier is included in the first or second list of uniform resource identifiers, transmit one or more messages to the client electronic device or to a destination via the Internet, the destination indicated by the HTTP request received via the client electronic device. The one or more non-transitory computer-readable media may include additional, fewer, or alternate instructions, including those described herein.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed embodiments, and explain various principles and advantages of those embodiments.

FIGS. 4A-4E depict signal diagrams representative of example processes for handling HTTP request traffic from the client device, in accordance with some embodiments;

DETAILED DESCRIPTION

Figure 1:
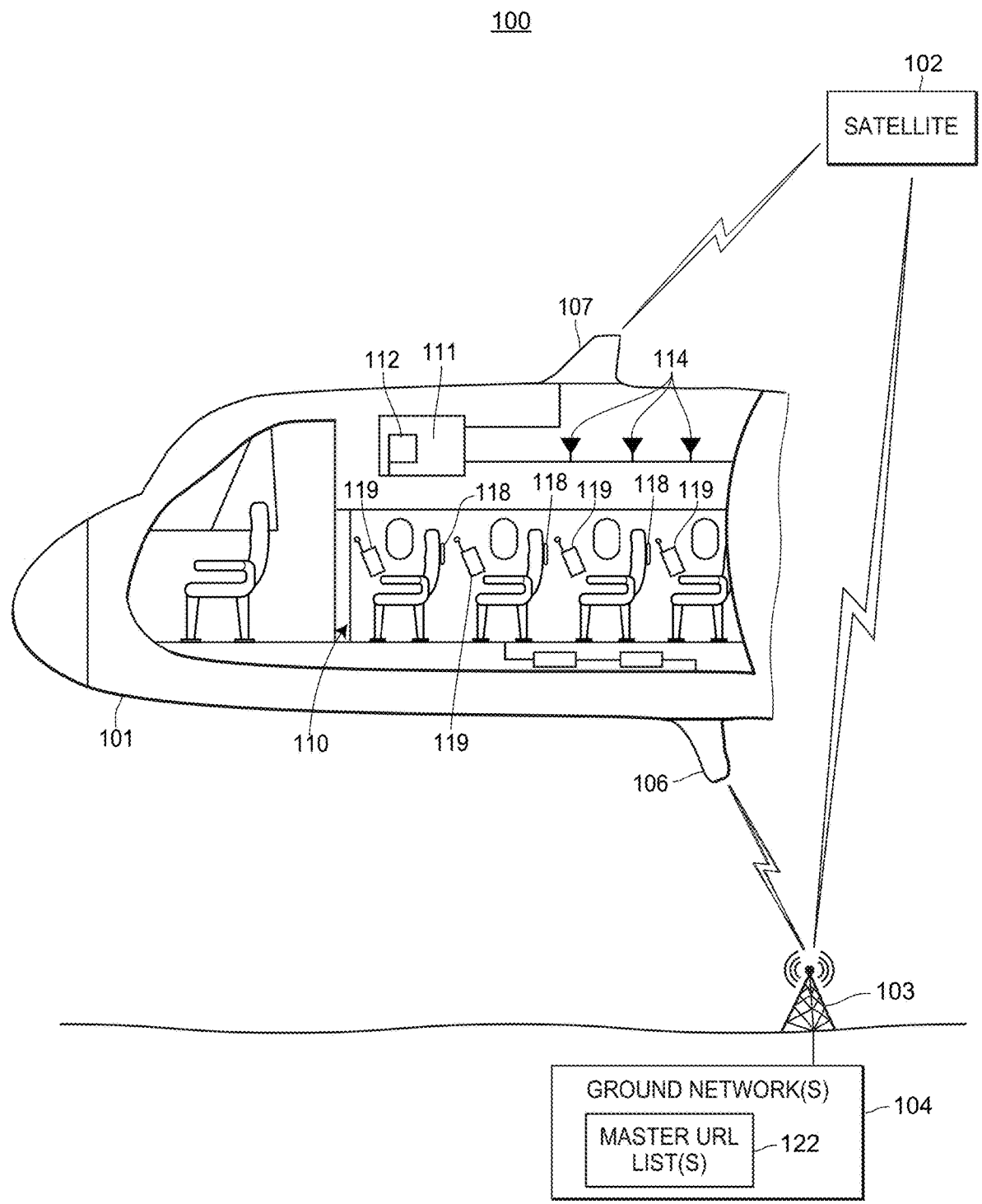
FIG. 1 depicts an example computing environment in which the techniques described herein may be implemented, in accordance with some embodiments.

At a high level, the disclosure of the present application describes techniques for providing Internet connectivity to client electronic devices aboard aircraft, within other vehicles, or in other environments that utilize a visitor-based communication service. Particularly, a controller of the visitor-based communications service may intelligently monitor and handle HTTP request traffic from client devices in a manner that prevents undesirable delays and interruptions in service emerging from limited functionalities of captive browsers utilized by the respective client devices.

As way of background, a connectivity provider may operate within an environment, such as an aircraft in transit, to provide to client devices (e.g., smartphones, tablets, laptops, and/or the like) a visitor-based communication service providing temporary access to a limited "whitelisted" amount of Internet websites/services via the World Wide Web. Such whitelisted websites/services may, for example, include social media websites and websites specifically relating to the environment itself (e.g., relating to an airline or connectivity provider through which service is provided), but may exclude other websites/services, such as those posing a security risk, those including inappropriate content, or those to which access would include excess network capacity demands (e.g., video streaming sites/applications). In an aircraft environment, client devices typically access a visitor-based communication service via a Wi-Fi network made available in a cabin of the aircraft, the Wi-Fi network made available via a number of wireless access points. Upon automatic or manual connection to the Wi-Fi network, a client device is assigned a particular IP address (e.g., from a pool of available IP addresses via Dynamic Host Configuration Protocol (DHCP), and/or via other means), thereby enabling the client device to transmit and receive communications via the Wi-Fi network.

A common feature of visitor-based communication services is a "captive portal," which may include one or more web pages via which the client device may provide payment, provide authentication, review and accept a use policy, and/or perform other actions prerequisite to accessing the service. Typically, when a client device is connected to the wireless network but has not yet performed such actions, a client device may transmit request to access a website using HTTP, and the client device may be automatically redirected to the captive portal, such that the client device may perform those actions necessary to access the visitor-based communication service.

One means by which a client device may transmit the HTTP request is by way of entering a non-secure (HTTP) URL into an address bar of a browser. However, some recently developed client devices, upon association with a wireless network, automatically send HTTP requests known as "HTTP captivity probes" (also referred to herein as "HTTP probe" or simply "probe") and wait for a response. These probes are effectively "dummy requests" to a test URL to determine whether or not the network to which the device is connected is a limited-access "captive" network. If, in response to the probe, the client device receives an HTTP 2xx response (i.e., the response contains a status code with a leading digit "2," corresponding to "success"), such a response generally indicates that Internet access is available without restriction. If, on the other hand, the client device receives an HTTP 3xx response (i.e., the HTTP response contains a status code with a leading digit "3," corresponding to "redirection,"), Internet access in the network is restricted, thus indicating that the client device must perform some further action before accessing the Internet via the network. Accordingly, upon receiving a 3xx response to an HTTP captivity probe, a client device may automatically launch a "captive browser," which is typically a hardcoded browser window having limited browser functionality (e.g., Captive Network Assistant (CNA) for devices using macOS) compared to a fully-capable browser (e.g., Safari for macOS, or Google Chrome). Via the captive browser, the client device ostensibly may complete any prerequisite action(s) before having access to the Internet through the visitor-based communication service.

However, it is observed that technological capabilities vary between the captive browsers utilized by client devices and operating systems. In particular, some captive browsers cannot execute JavaScript, which is relied upon by many captive portal pages among other websites/services offered by visitor-based communication services. Thus, an automatic launching of the captive portal in a captive browser of a client device may place the client device in a situation in which the client device cannot execute the actions necessary to gain access to the visitor-based communication service. Effectively, the client device is "stuck" in the captive browser, preventing the client device from accessing the captive portal until a user of the client device manually opens a fully-capable browser and manually enters an HTTP URL, thereby causing the fully-capable browser to be redirected to the captive portal in which prerequisite actions can be performed. This requirement of manual HTTP URL entry is particularly inconvenient in that most popular websites utilize HTTPS protocol, in which redirection does not occur. That is, access to the captive portal requires a counterintuitive, manual entry from the user. Moreover, even once the client device gains access to the visitor-based communication service, the client device might still transmit HTTP captivity probes. This is particularly problematic in the case of a limited-access communication services in which captivity probes are not included among the service's whitelisted website URLs. Any non-whitelisted HTTP captivity probe will be redirected (e.g., to the service portal), thereby unintentionally causing the client device again to launch its captive browser. This presents an inconvenient interruption for a user of the client device, and further may encounter the same technological limitations of the captive browser as mentioned above.

Thus, an objective for a connectivity provider is to prevent client device HTTP captivity probes from being redirected, to thereby prevent launching of captive browsers. An attractive means for accomplishing this objective is to record a list of URLs corresponding to HTTP captivity probes, and include those URLs in the whitelisted services/ websites. This solution would allow HTTP requests to those URLs (i.e., HTTP captivity probes) to reach their destinations uninhibited, receive a 2xx success response rather than a 3xx redirection, and thereby prevent captive browser activation. However, this approach encounters difficulties. Although some popular HTTP captivity probe URLs are known, different client devices and operating systems use different captivity probes, and not all probes are known. Moreover, even if all common probes were known at a given time, new probes may emerge upon development of new client devices and operating systems.

In consideration of these problems, this detailed description generally proposes techniques for (1) tracking uniform resource identifiers (e.g., URLs) corresponding to HTTP captivity probes, and (2) monitoring client device HTTP traffic to identify probes not previously included in the list, thereby allowing the list to be dynamically updated when new probes are detected.

To allow for detection of existing and new HTTP captivity probes, certain characteristics of current HTTP captivity probes are identified. In particular, it is found that probe URLs typically include static URLs, but not dynamic URLs. Dynamic URLs generally are URLs that include variable parameters, which are used by a server to affect delivery of content. Such dynamic URL parameters can include a query string, typically comprising PHP text and/or special characters (particularly, "?" and/or "="). Static URLs, unlike dynamic URLs, do not contain a query string, do not contain PHP, and do not contain special characters ("?" and "="). Additionally, HTTP captivity probe URLs are typically limited in length, usually having a length less than or equal to 50 characters. Furthermore, HTTP captivity probes can be characterized by the contents of the response thereto. In particular, the size of the response itself is small, typically less than or equal to 5 kilobytes (kB).

Thus, techniques described herein generally include creating and dynamically maintaining two lists of URLs, based upon which a controller of a communication service may handle HTTP request traffic from a client device. A first URL list, referred to herein as a "CaptiveWhitelist" includes URLs known to correspond to HTTP captivity probes. A second URL list, referred to herein as a "redirect list" (or "RedirectList") includes HTTP URLs that do not correspond to HTTP probes. Particularly, this second list includes URLs that may share the characteristics of HTTP captivity probe URLs, but which are observed to return responses indicative that the URLs are not probes (e.g., the responses exceed 5 kB).

In operation, a controller ma receive, via a wireless communication network in the environment, receive HTTP request traffic originating from client devices. For each HTTP request, the may analyze the URL of the request to determine whether the URL exhibits the characteristics of HTTP probe URLs (no query text, no PHP, no special characters, no greater than 50 characters), and also determine whether the URL is already included in either of the first or second lists. If the URL does not exhibit the understood characteristics of HTTP probe URLs at all (and hence, appears on neither the first nor the second list) the controller may redirect the request to the service portal. If the requested URL is included in the current RedirectList, the controller may similarly redirect the request to the visitor service portal. If the requested URL is included in the CaptiveWhitelist, the request is allowed to its intended destination. If the URL is neither included the Captive-Whitelist nor included in the Redirect List, the HTTP request is allowed to its intended destination. For these requests, the controller monitors the response to the HTTP request, and particularly, determines whether the response exceeds 5 kB in size. If the response exceeds this size, it may be determined that the original request was not a probe, and hence the controller may disconnect the response and add the URL to the RedirectList. Conversely, if the size of the response does not exceed 5 kB, it may be determined that the original request is a new probe, and the controller may add the URL to the CaptiveWhitelist.

In effect, from a plurality of HTTP requests from one or more client devices, a first portion of the requests (which are determined not to be captivity probes) may be redirected to the visitor service portal. Because the first portion of the requests are not HTTP captivity probes, redirection should not cause captive browser activation. A second portion of the plurality of HTTP requests are allowed to their respective destinations, the second portion including (1) requests known to be HTTP captivity probes, and (2) requests which may or may not be probes, for which further monitoring is required and which may eventually be redirected only when the requests are determined not to be probes. Because captivity probes are not redirected, client devices avoid automatic activation of their captive browsers.

Thus, an updated list of HTTP captivity probes (as well as a list of URLs that are not probes) may be created and maintained by a controller of a visitor-based communication service, with the list accommodating new HTTP captivity probes utilized by newly developed client devices. Furthermore, in some embodiments, machine learning algorithms such as classification analysis may be performed to identify additional characteristics of HTTP captivity probes (e.g., characteristics of the URL and/or of the HTTP response) based upon which HTTP requests may subsequently be evaluated.

It should be noted that, in this detailed description, various actions are described as being performed by a client device. Although many such actions may be performed automatically via the client device, at least some such actions may additionally or alternatively be performed manually by a user thereof (e.g., interaction via a graphical user interface of the client device). Thus, unless indicated otherwise, it should be understood actions of a client device may refer to actions of the client device itself, interactions of a user via the client device, or any suitable combination thereof.

Throughout this detailed description, techniques are described with respect to an example implementation in an aircraft environment. However, it should be understood that other environments are envisioned. The techniques described herein may, for example, be implemented in other vehicles (e.g., boats, buses, trains), particularly those that are in-transit and in which a visitor-based communication service is the only available means of Internet connectivity. The techniques described herein may also be implemented in other suitable non-vehicle environments, such as hotels, restaurants, or transit centers. Accordingly, where terms specific to aircraft are used herein, it should be understood that analogous terms may be envisioned for other environments in which these techniques are implemented.

Example Aircraft Environment

FIG. 1 depicts an example aircraft communication environment 100 via which the techniques described herein may be implemented.

An aircraft 101 may be communicatively connected (via one or more satellite links via one or more satellites 102 and/or via one or more Air-to-Ground [ATG] links) to a ground base station 103 (e.g., one or more ground base stations). The base station 103 may facilitate unidirectional or bidirectional communications between the aircraft 101 and one or more ground networks 104. The one or more ground networks 104 may particularly include the Internet, but may additionally or alternatively include the Public Switched Telephone Network (PTSN) and/or other communication networks external to the aircraft 101. The external communication link(s) between the aircraft 101 and the base station 103 may be enabled via one or more aircraft-mounted ATG antenna systems 106 and/or one or more aircraft-mounted satellite antenna systems 107. The external communication link(s) may correspond to one or more particular communication protocols (e.g., TDMA, GSM, CDMA, GSM, LTE, WiMAX, Wi-Fi, etc.) and/or to one or more particular frequency bands (e.g., $K_a$ band, $K_u$ band, L band, S band, Cellular band, AWS Band, PCS band, an unlicensed band, etc.).

The aircraft 101 may contain a communication architecture that establishes a Local Area Network (LAN) 110 (e.g., a wired LAN and/or wireless LAN using WLAN communications protocols) within a cabin of the aircraft. In particular, the Local Area Network 110 may enable devices aboard the aircraft to utilize a visitor-based communication service to wirelessly download and access applications, consume media, and/or access other content/services available via the ground network(s) 104.

The aircraft 101 may include an on-board server 111 (or "controller," e.g., an Airborne Control Processor Unit (ACPU)), which may include one or more computing devices. The on-board server 111 may include one or more non-transitory computer memories 112 storing instructions that, when executed, cause the on-board server to perform actions described herein. The on-board server 111 may generally operate to establish and manage operations of the Local Area Network 110 within the aircraft 101, particularly operations of a visitor-based communication service, which may include provision of (1) content that may be locally stored via the one or more non-transitory computer memories 112, and/or (2) content obtained via the ground network(s) 104 (e.g., Internet content).

The on-board server 111 may be coupled to one or more modems communicatively connected to the antenna(s) 106 and/or 107 to exchange unidirectional and/or bidirectional communications with the ground network(s) 104 via the base station 103, thereby providing access to systems, nodes, and devices not located within the aircraft 101. That is, the on-board server 111 may determine that data (e.g., web traffic such as HTTP requests) transmitted by one or more computing devices on-board the aircraft 101 is addressed to a location external to the aircraft 101, and may route the data via the one or more modems to the base station 103 via one or more ATG communication links and/or satellite communication links. Conversely, the on-board server 111 may, via the one or more modems and antennas 106 and/or 107, receive data addressed to a location within the aircraft 101, and may route the data to the location within the aircraft 101. In some embodiments, one or more computer-readable media may store computer-executable instructions that, when executed via one or more computer processors, cause the on-board server 111 to perform actions of the on-board server 111 described herein.

One or more wireless access points 114 may be operatively connected (wiredly and/or wirelessly) to the on-board server 111. Although FIG. 1 depicts three wireless access points 114, it should be understood that the environment 100 may include additional or fewer wireless access points. The wireless access points 114 may operate according to one or more wireless local area network (WLAN) communication protocols, such as one or more IEEE 802.11 (Wi-Fi) protocols (e.g., 802.11b, 802.11g, 802.11ac, etc.) to support wireless communications among various devices within and/or proximal to the aircraft 101.

The on-board server 111 and/or wireless access point(s) 114 may facilitate communications with one or more client electronic devices 119. The one or more client devices 119 may include, for example, smartphones, PDAs, tablet computing devices, laptop computing devices, and/or other personal computing devices carried on-board the aircraft 101 by passengers and/or crew members. Passengers and/or crew members may use respective client devices 119 to access a visitor-based communication service as described herein. The on-board server 111 facilitate wireless registration, authentication, and/or authorization of the client devices 119 (e.g., device, application, or user registration/authentication/authorization) to access services/content via the visitor-based communication service. Additionally, the on-board server 111 may receive Web traffic from client devices 119 and handle HTTP requests using techniques described herein.

As will be described herein, providing the visitor-based communication service may include generating and updating one or more lists of URLS, which may include a CaptiveWhitelist composed of URLs corresponding to HTTP captivity probes, and/or a RedirectList composed of URLs that are not probes ("non-probes"). In some embodiments, the URL list(s) may be generated, updated, and/or stored at the one or more non-transitory computer memories 112 (on-board the aircraft 101). In some embodiments, the URL list(s) may be generated and/or updated via the ground network(s) 104 and may be stored as "Master URL List(s)" 122 accessible via the ground network(s) 104. In these embodiments, updates to URL lists may be exchanged between the aircraft 101 and the ground network(s) 104. For example, where two or more aircraft 101 implement the techniques described herein, URL list data may be exchanged among each of the two or more aircraft 101 via the ground network(s) 104.

It should be understood that the aircraft communication environment 100 may include additional, fewer, and/or alternate computing components. Furthermore, it should be understood that the aircraft communication environment 100 is just one environment in which the techniques described herein may be implemented. Other environments are possible, and may include analogous computing components.

Example Wi-Fi Network Association and Visitor-Based Service Access

Figure 2:
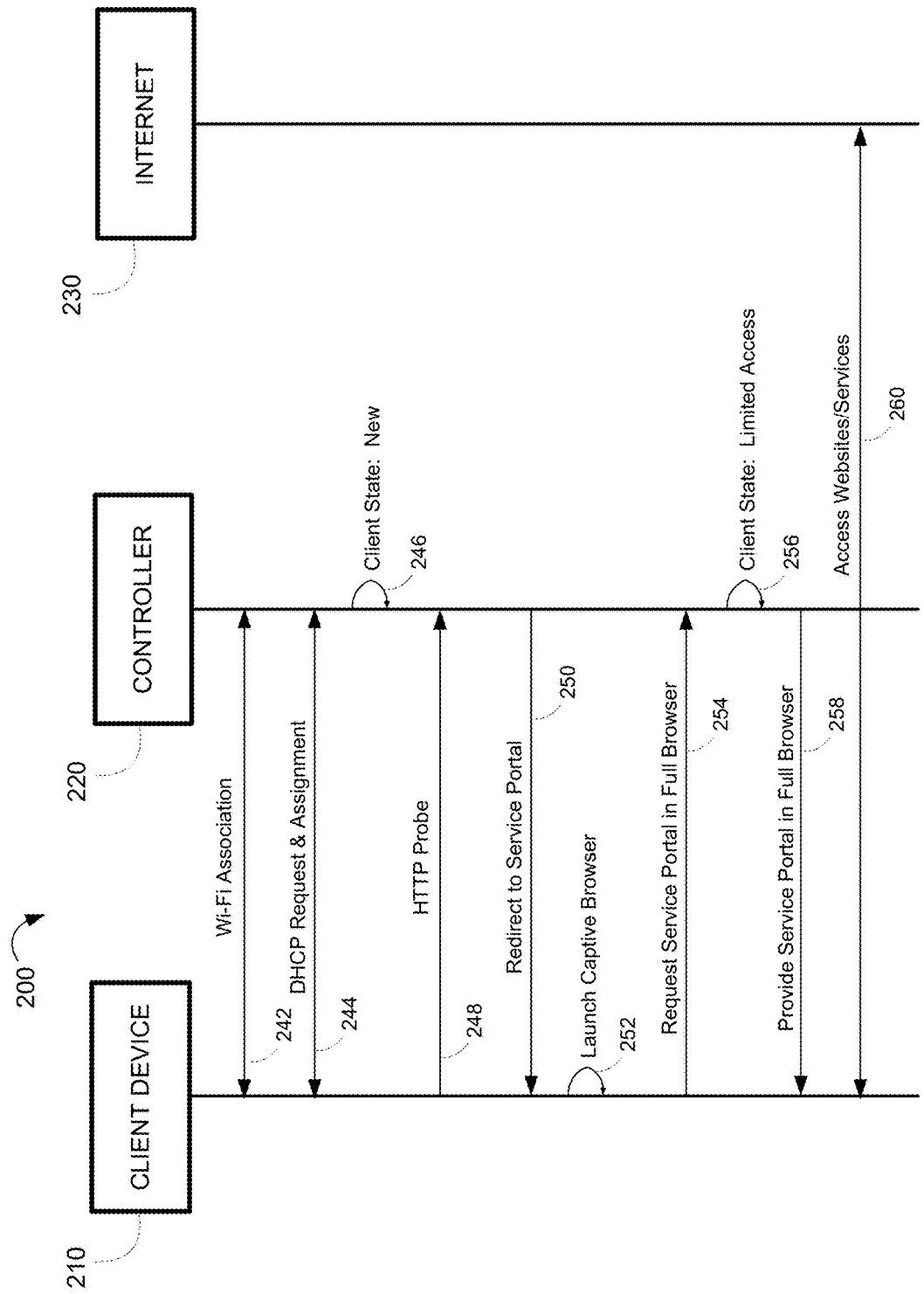
FIG. 2 depicts an signal diagram illustrating an example process for initially providing a client device access to a visitor-based communication service, in accordance with some embodiments.

FIG. 2 illustrates an example signal diagram 200 associated with initial client device access to a visitor-based communication service. Communications depicted in the signal diagram 200 may be implemented, for example, via elements of the computing environment 100 of FIG. 1. The signal diagram 200 will be described with respect to FIGS. 3A-3C, which depict example client user interfaces that may be provided as part of the actions of the signal diagram 200. It should be understood that the signal diagram 200 may include additional, fewer, and/or alternate actions to those depicted herein. Moreover, order of actions of the signal diagram 200 may vary, where appropriate.

Communications of the signal diagram 200 generally include communications among a client electronic device 210, a controller 220, and the Internet 230. The client device 210 and controller 220 may be disposed locally in a local environment in which a visitor-based communication service is provided via a wireless (and/or wired) communications network. Providing the visitor-based communication service may generally include providing access to a "visitor service portal" composed of a number of whitelisted websites/services, which may include content available via the Internet 230. In an example aircraft implementation as depicted in FIG. 1, the client device 210 may be an on-board cline device 119, the controller 220 may be an on-board server 111, and the Internet 230 may be one of the one or more ground networks 104.

Figure 3A:
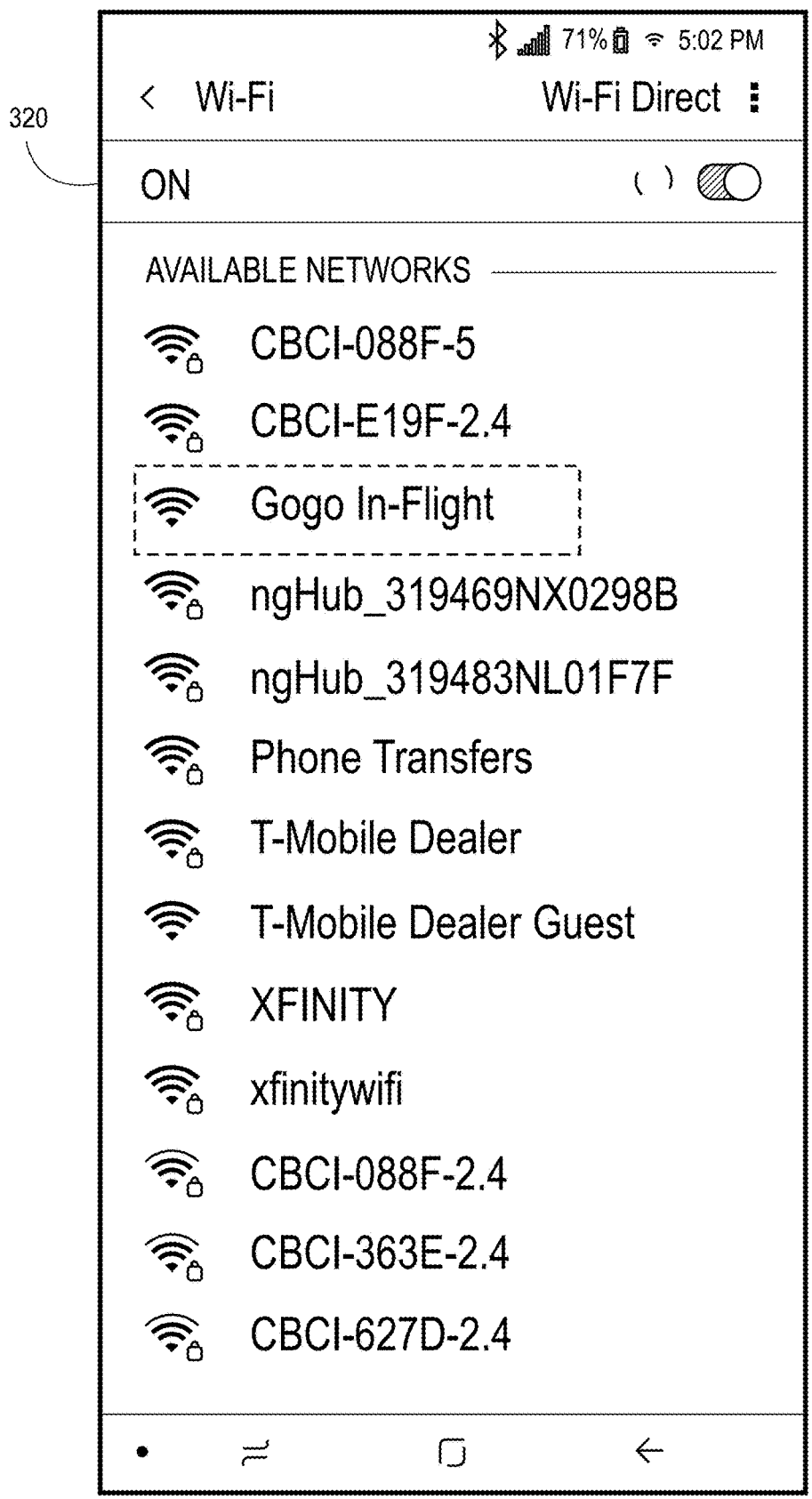
FIGS. 3A-3C depict example graphical user interfaces presented via the client device via the actions of FIG. 2, in accordance with some embodiments.

Upon entering the local environment, the client device 210 may associate with a wireless communication network implemented within the local environment (242), for example via communications via one or more wireless access points disposed in the local environment. In some embodiments, the client device 210 may automatically connect to the wireless network. In some embodiments, a user of the client device 210 may manually cause the client device 210 to become connected to the wireless network. FIG. 3A depicts a user interface 320 that may be provided via a display of the client device 210, and via which the user may cause the client device to become connected to the wireless communication network. Based upon a user interaction with the user interface 320 (e.g., a touchscreen interaction to select "Gogo In-Flight"), the client device 210 may communicate to the controller 220 a request to connect to the wireless network. Association with the wireless network may operate via one or more wireless local area network (WLAN) communication protocols, such as one or more IEEE 802.11 (WiFi) protocols (e.g., 802.11b, 802.11g, 802.11ac, etc.). In some embodiments, connecting the wireless network may require entry of a password and/or other authorization from the client device 210 (e.g., a WPA2-secured network). Upon associating with the wireless network, an IP address may be assigned to the client device 210 (244), for example via Dynamic Host Configuration Protocol (DHCP). In particular, upon connecting to the wireless network, the client device 210 may request an IP address assignment, and the controller 220 may allocate an IP address to the client device 210, for example via selection from a predefined range of IP addresses, and/or via other techniques for IP address assignment.

Upon IP address assignment, the controller 220 may set a state of the client device 210 to "New" (246). The controller 220 may, for example, add the client device 210 to a list of known client devices maintained by the controller 220. For the client device 210 in the "New" state, the controller 220 may be configured to block Internet access, such that any subsequent outgoing HTTP requests from the client are redirected to the visitor service portal, as will be described herein. Upon connection to the wireless network, the client device 210 may transmit an HTTP captivity probe (248). One example HTTP captivity probe, utilized by devices running the operating system macOS, is a request to the URL "captive[dot]apple[dot]com/hotspot-detect[dot]html." However, HTTP captivity probes differ between devices, and may be subject to change upon development of new devices and operating systems. Thus, not all HTTP captivity probe URLs may be known.

Upon receiving HTTP captivity probe transmitted by the client device 210, the controller 220 may redirect the request to the visitor service portal (250). Specifically, the controller 220 may provide a HTTP 3xx response message to the client device, the response message comprising one or more HTTP objects of a webpage to be displayed via the client device 210.

Figure 3B:
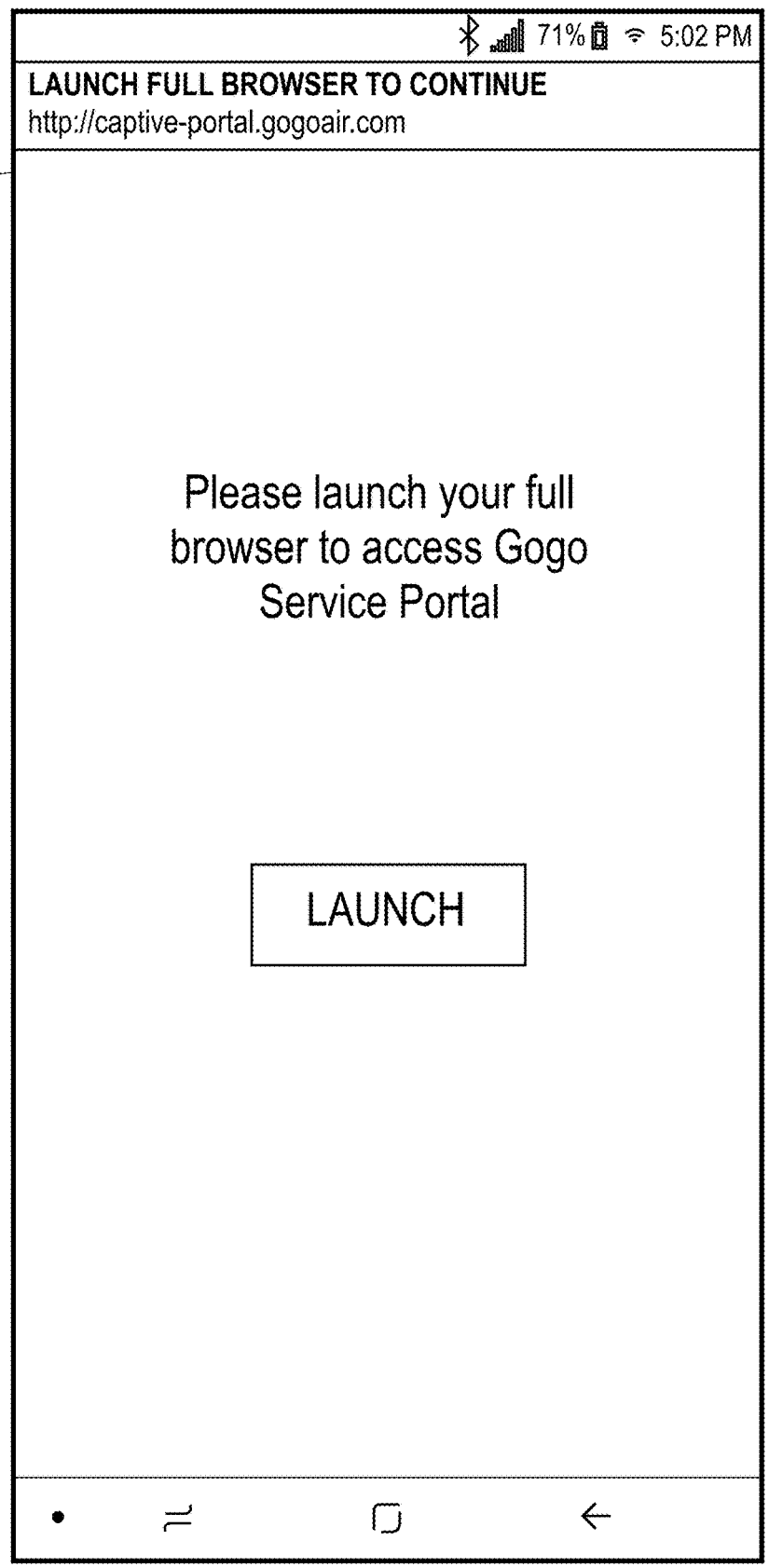

The redirect response causes the client device 210 to launch its native captive browser to display the one or more HTTP objects (252). An example captive browser, for devices running macOS, is Captive Network Assistant (CNA). However, different client devices may utilize different captive browsers, which may have differing technological capabilities. Thus, it is intended that the webpage provided via the captive browser be a simple webpage informing the user of the client device 210 that client device 210 that the client device 210 will be required to open a fully-capable browser of the client device 210 to proceed to access the visitor-based communication service. FIG. 3B depicts another example user interface 340 at the client device 210. In accordance with the above, the user interface 340 displays a webpage informing the user that the client device 210 must open a fully-capable browse to proceed to access the visitor-based communications service. In some embodiments, the user interface 340 may include a user control that, upon a user interaction (e.g., touchscreen interaction), causes the client device 210 to launch the fully-capable browser. Additionally or alternatively, in some embodiments, the client device 210 may be caused to automatically launch the fully-capable browser after a predefined period of time (e.g., five seconds after providing the user interface 340). In any case, simplicity of the webpage displayed in the captive browser may avoid a problem wherein the captive browser is unable to display certain content, and thus the client device 210 may be prevented from becoming stuck within the captive browser.

Returning to FIG. 2, the client device may automatically and/or manually request for the visitor service portal to be provided in the fully-capable browser (254). Responsive to the request, the controller 220 may change the recorded state of the client device from "New" to "Limited Access," at which point limited Internet access may be granted to the client device 210 in accordance with the visitor-based communication service (e.g., a list of "whitelisted" websites/services). The controller 220 may provide the visitor service portal in a fully capable browser of the client device (258), at which point the client device 210 is enabled to access the Internet 230, among other resources, via communications facilitated by the controller 220 (260). For the client device 210 in the Limited Access state, the controller 220 may monitor and handle HTTP requests from the client device 210 in accordance with techniques described throughout this detailed description.

Figure 3C:
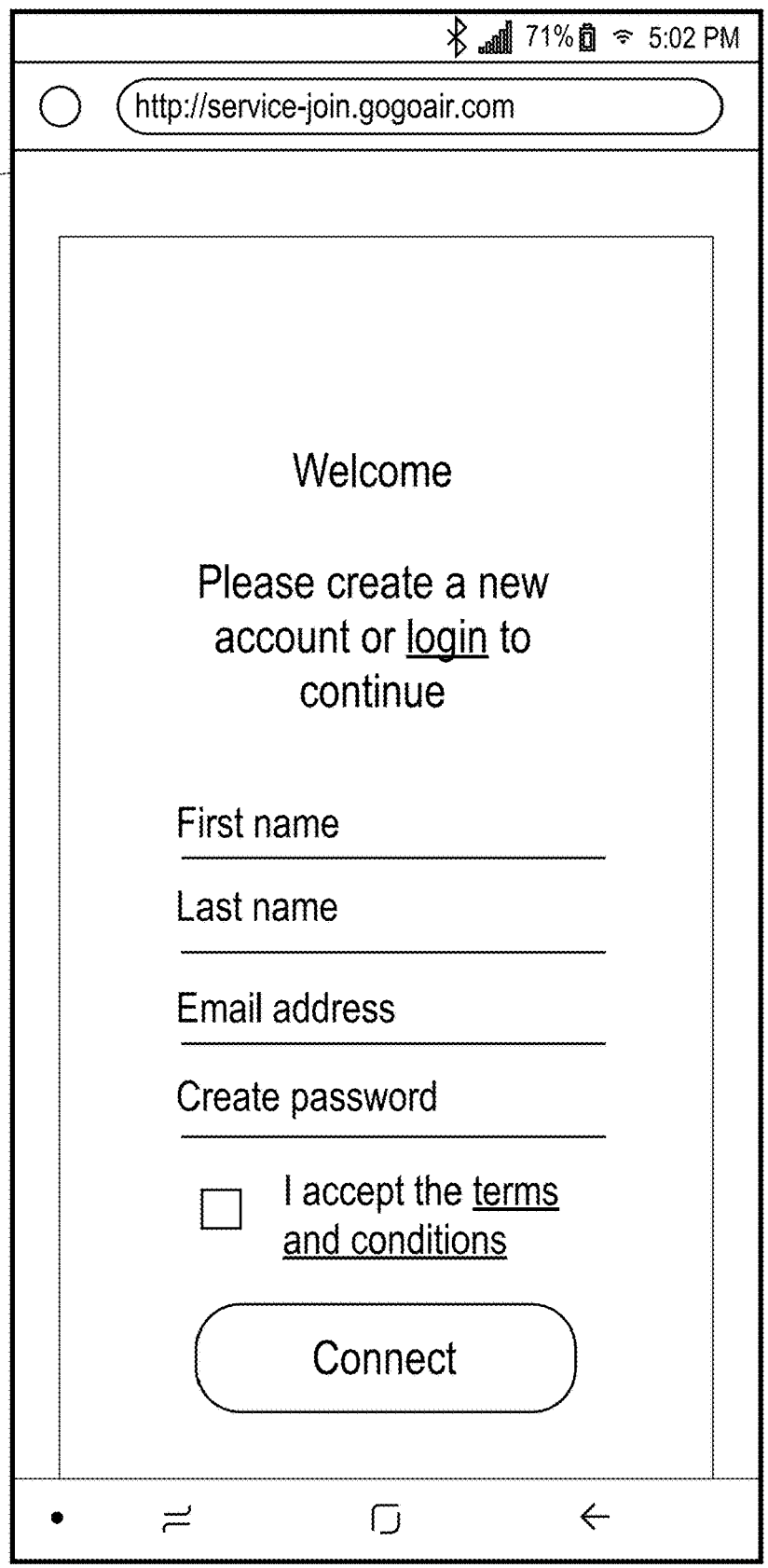

FIG. 3C depicts another example user interface 360 that may be provided in accordance with the actions 258 and/or 260. Particularly, the interface 360 includes a webpage of a captive portal portion of the visitor service portal. Within the captive portal, the user of the client device may login, create a new user account, accept a use policy of the visitor service portal, provide payment, and/or complete other actions prerequisite to accessing the visitor-based communication service. In some embodiments, requests to access other portions of the visitor service portal may automatically be redirected to the captive portal if the client device 210 has not completed the one or more prerequisite actions.

Example HTTP Traffic Handling Upon Access to Visitor-Based Service

At a high level, providing access to visitor-based communication service may include granting requests by the client to access a collection of whitelisted websites and/or services, and denying access to websites/services not included in the whitelist. More particularly, prevent re-launching of the captive browser, the controller may maintain a whitelist of URLs known to be HTTP captivity probes. The whitelist of HTTP captivity probe URLs may be referred to as "CaptiveWhitelist." Additionally, the controller may maintain a second list of URLs that exhibit some traits in common with HTTP captivity probe URLs (e.g., "front-end" request characteristics such as static URL and limited character count) but which are not in fact probes (e.g., as evidenced by "back-end" characteristics of a response to the request, e.g., response size greater than a threshold size). Requests to these URLs are to be redirected to the visitor service portal, and thus the list of these URLs may be referred to as the "RedirectList."

FIGS. 4A-4E depict example signal diagrams representative of respective scenarios that may occur in accordance with these techniques. Generally, in each scenario, the client device 210 transmits an HTTP request via a web browser and/or another application of the client device 210. The controller 220 receives the HTTP request and analyzes the requested URL to determine whether the HTTP request may or may not be an HTTP captivity probe. Particularly, the controller 220 may determine (1) whether the URL is a static URL or a dynamic URL, and/or (2) whether the requested URL is included in the CaptiveWhitelist (i.e., a probe), is included in the RedirectList (i.e., not a probe), or is not included in either list. Depending on these determinations, further actions are performed. Such request handling as depicted in FIGS. 4A-4E generally operates to prevent known and unknown HTTP captivity probes from being redirected, thereby preventing launching of the captive browser of the client device 210.

In some embodiments, the CaptiveWhitelist and/or the RedirectList may be stored locally at the controller 220. Additionally or alternatively, in some embodiments, the CaptiveWhitelist and/or the RedirectList may be stored exterior to the local environment, for example at another location accessible via the Internet 230. Accordingly, analyzing an HTTP request with respect to either or both lists may include communications to and/or from the controller 220 over the Internet 230. It should also be noted that the signal diagrams in FIG. 4A-4E will generally address handling of HTTP requests from client devices, rather than HTTPS requests. HTTPS request security protocol does not permit redirection, and thus a client device would not be able to detect captivity based upon a redirection. However, it should be noted that where an "HTTP redirection" from the controller 220 is described, the HTTP redirection may be a redirection to an HTTPS URL (e.g., to an HTTPS secure web page of the visitor service portal). In particular, in some embodiments in none of the websites/services of the visitor service portal utilize HTTP (e.g., the websites/services use HTTPS instead), any and all HTTP requests determined not to be probes may be redirected (e.g., to an HTTPS secure webpage of the visitor service portal).

Figure 4A:
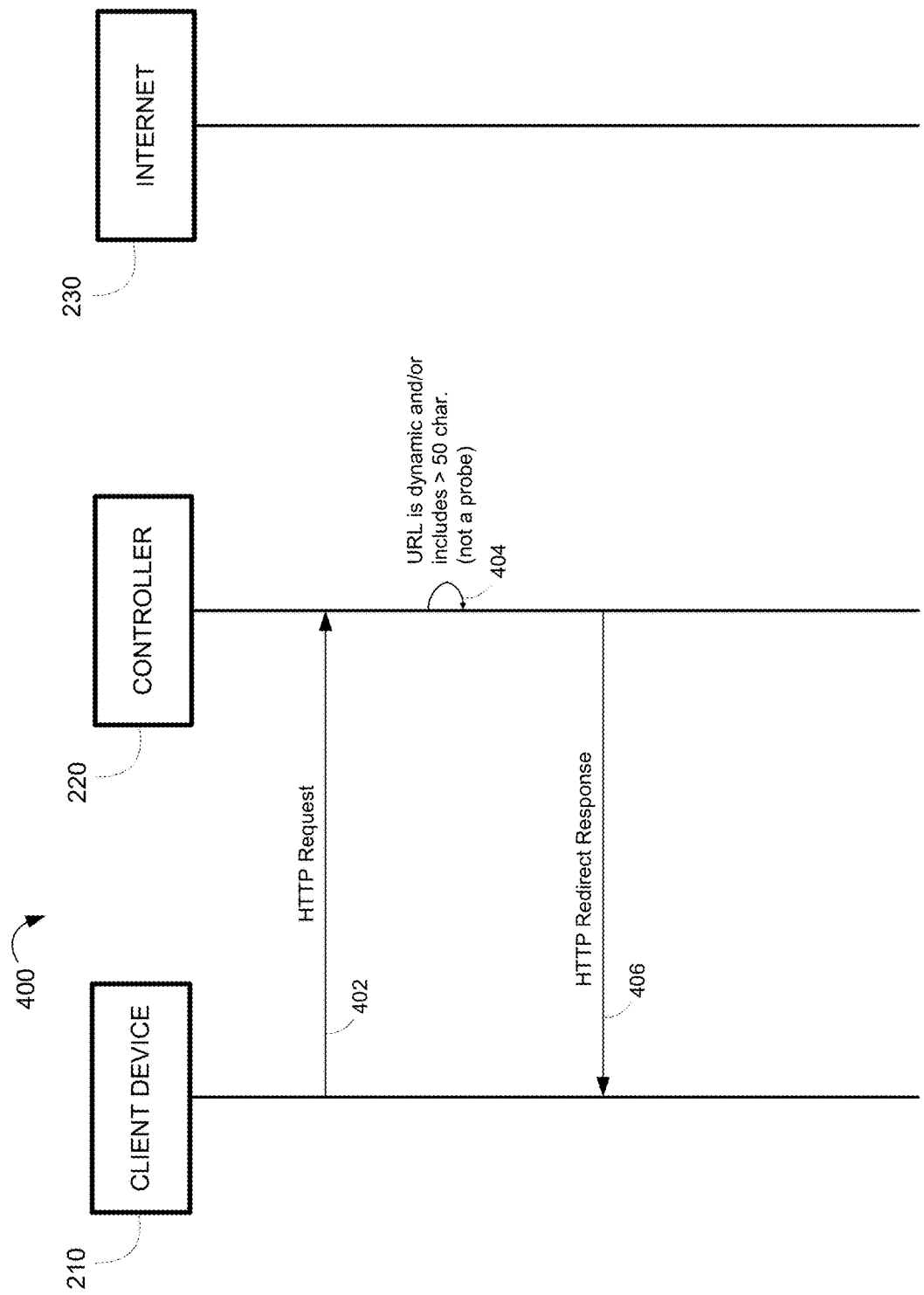

Starting with FIG. 4A, a signal diagram 400 depicts a first example scenario in which the client device 210 transmits an HTTP request, and the controller 220 receives the request (402). The controller 220 determines that the HTTP request URL is dynamic (e.g., contains a query string, PHP text, and/or a special character), and/or that the URL contains more than 50 characters (404). Known captivity probe URLs typically do not possess these characteristics, and thus the controller 220 determines that the HTTP request is not an HTTP captivity probe. Accordingly, responsive to the determination(s), the controller 220 transmits an HTTP redirect response to the client device 210 (406). The controller 220 may, for example, redirect the request to the visitor service portal. Because the HTTP request is not a captivity probe, the HTTP redirect should not cause the client device 210 to launch its captive browser.

Figure 4B:
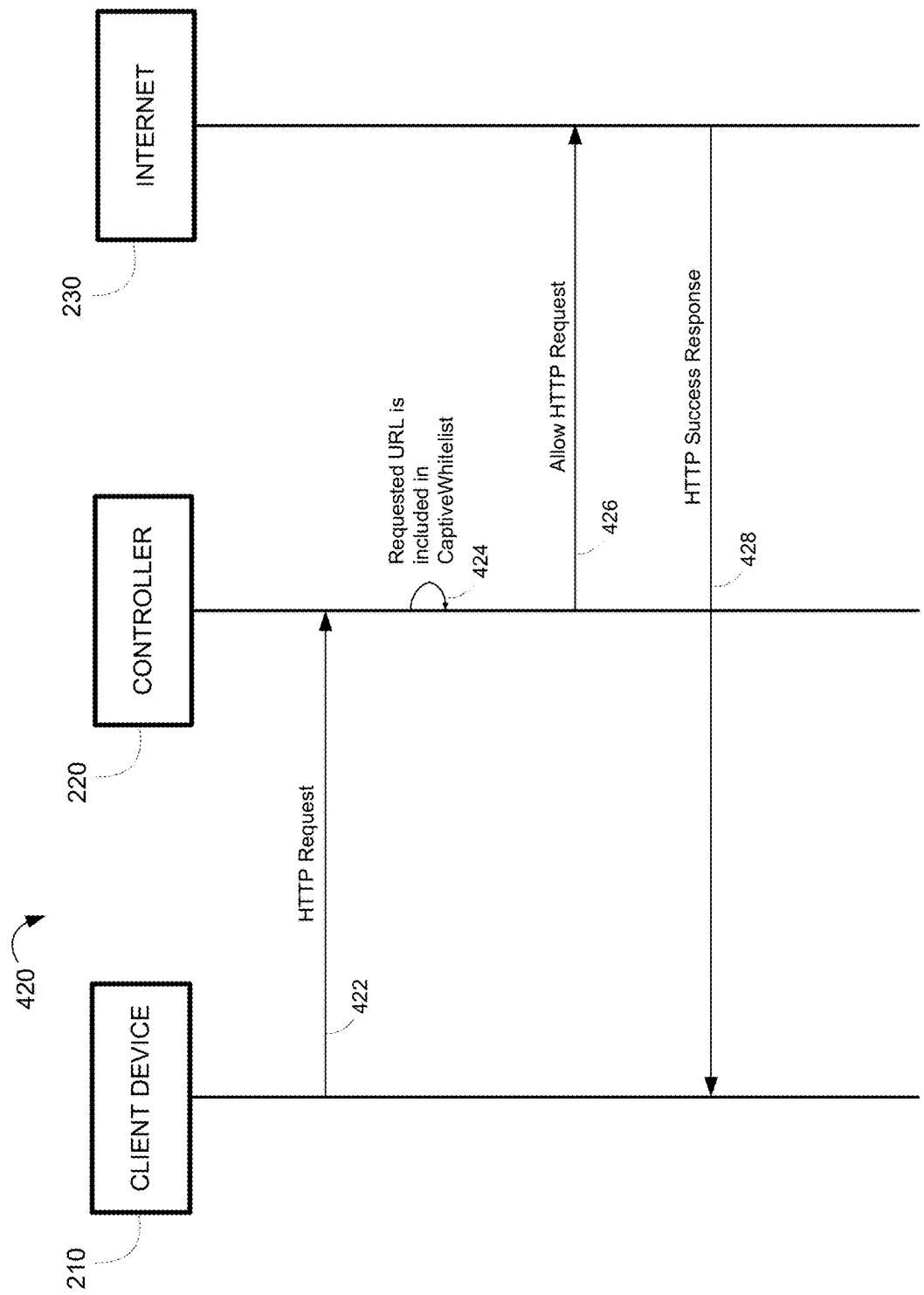

Moving to FIG. 4B, another signal diagram 420 depicts a second example scenario in which the client device 210 transmits an HTTP request, and the controller 220 receives the request (422). In this scenario, the controller 220 determines that the HTTP request URL is included in the CaptiveWhitelist (424). That is, the HTTP request URL is among the list of URLs believed to be HTTP captivity probes. Accordingly, to prevent redirection that might cause a captive browser of the client device 210 to be launched, the controller 220 allows the request to its destination over the Internet 230 (426). It is expected that the destination returns an HTTP "Success" Response (428). The response is passed to the controller 220, which returns the response to the client device 210. Because the HTTP request was allowed and a success response (2xx) was returned to the client device 210, the client device 210 does not launch its captive browser.

Figure 4C:
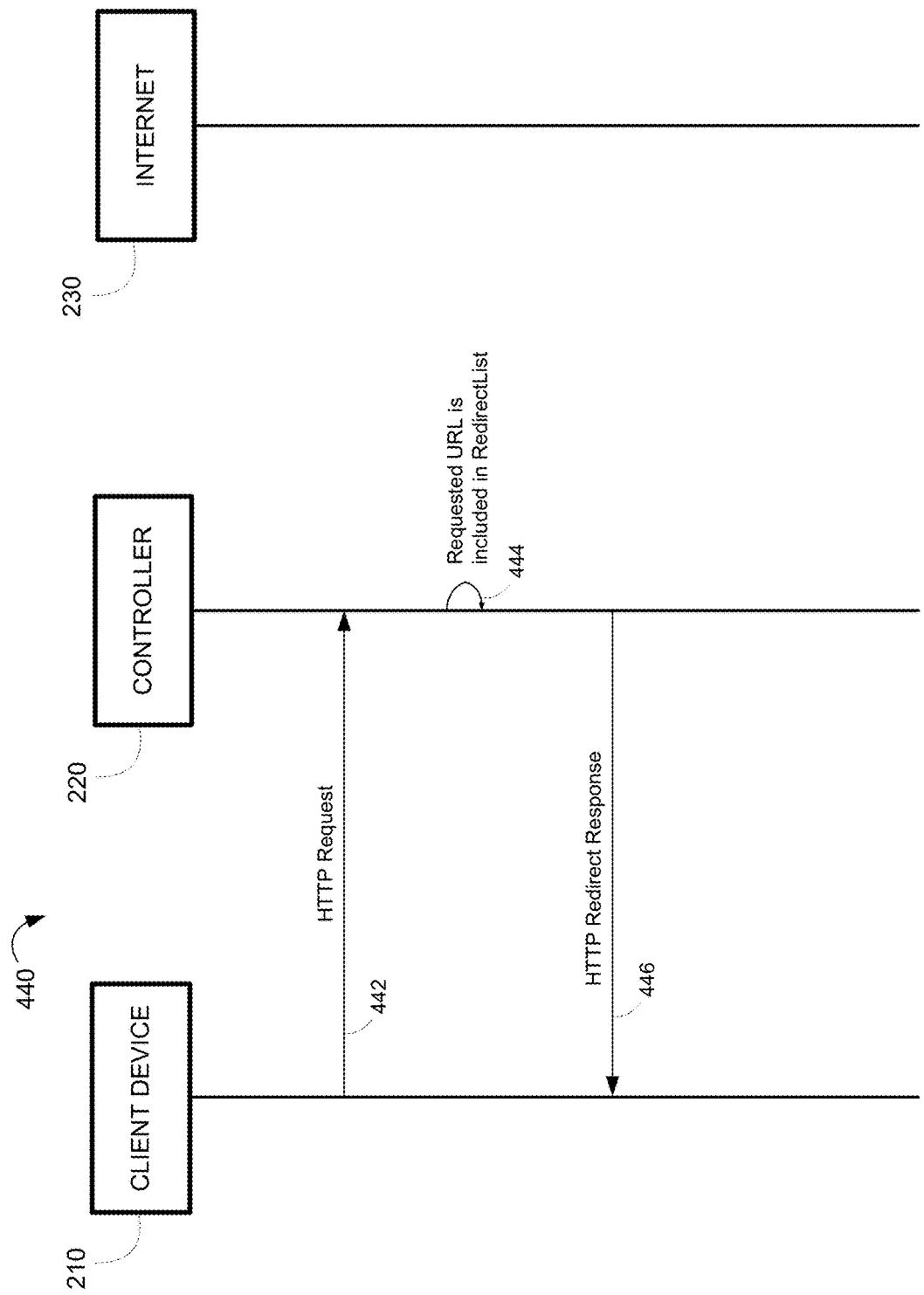

Moving to FIG. 4C, a signal diagram 440 depicts a third example scenario in which the client device 210 transmits an HTTP request, and the controller 220 receives the request (442). In this scenario, the controller 220 determines that the HTTP request URL is included in the RedirectList (444). That is, the HTTP request URL is among the list of URLs that are known not to be HTTP captivity probes (even if the requested URL is static, and/or shares other "front-end" characteristics with known HTTP captivity probes). Accordingly, responsive to the determination, the controller 220 transmits an HTTP redirect response to the client device 210 (446). The controller 220 may, for example, redirect the request to the visitor service portal. Because the HTTP request is not a captivity probe, the HTTP redirect response should not cause the client device 210 to launch its captive browser.

Moving now to FIG. 4D, a signal diagram 460 depicts a fourth example scenario in which the client device 210 transmits an HTTP request, and the controller 220 receives the request (462). In this scenario, the controller 220 determines that the requested URL is a static URL, but is neither on the CaptiveWhitelist nor on the RedirectList (464). Effectively, the request may or may not be an HTTP captivity probe. Accordingly, the controller 220 allows the HTTP request through to its destination over the Internet 230 (466) and awaits an HTTP response from the destination.

Upon receiving the response (468), the controller 220 analyzes the response. Particularly, the controller 220 determines whether the size of the response (or the size of a particular portion thereof, e.g., the response message body) exceeds a threshold size N (e.g., 5 kB). In this scenario, the controller 220 determines that the size is less than or equal to N (470), and thus the original HTTP request was likely a captivity probe. Accordingly, the controller 220 automatically causes the HTTP request URL to be added to the CaptiveWhitelist, locally at the controller 220 and/or at another location over the Internet 230. In some embodiments, the controller 220 may further transmit to the client device 210 an HTTP success response (474), so as to complete the original request in a manner that does not cause the client device 210 to launch its captive browser.

As a result of adding the original request URL to the CaptiveWhitelist, any subsequent HTTP request to the same URL may be identified as an HTTP captivity probe. Accordingly, if the same client device 210 or another client device transmits a request to the same URL, actions of the signal diagram 420 from FIG. 4B may be carried out to allow the HTTP request, return a success response, and prevent the requesting device from launching its captive browser.

Figure 4E:
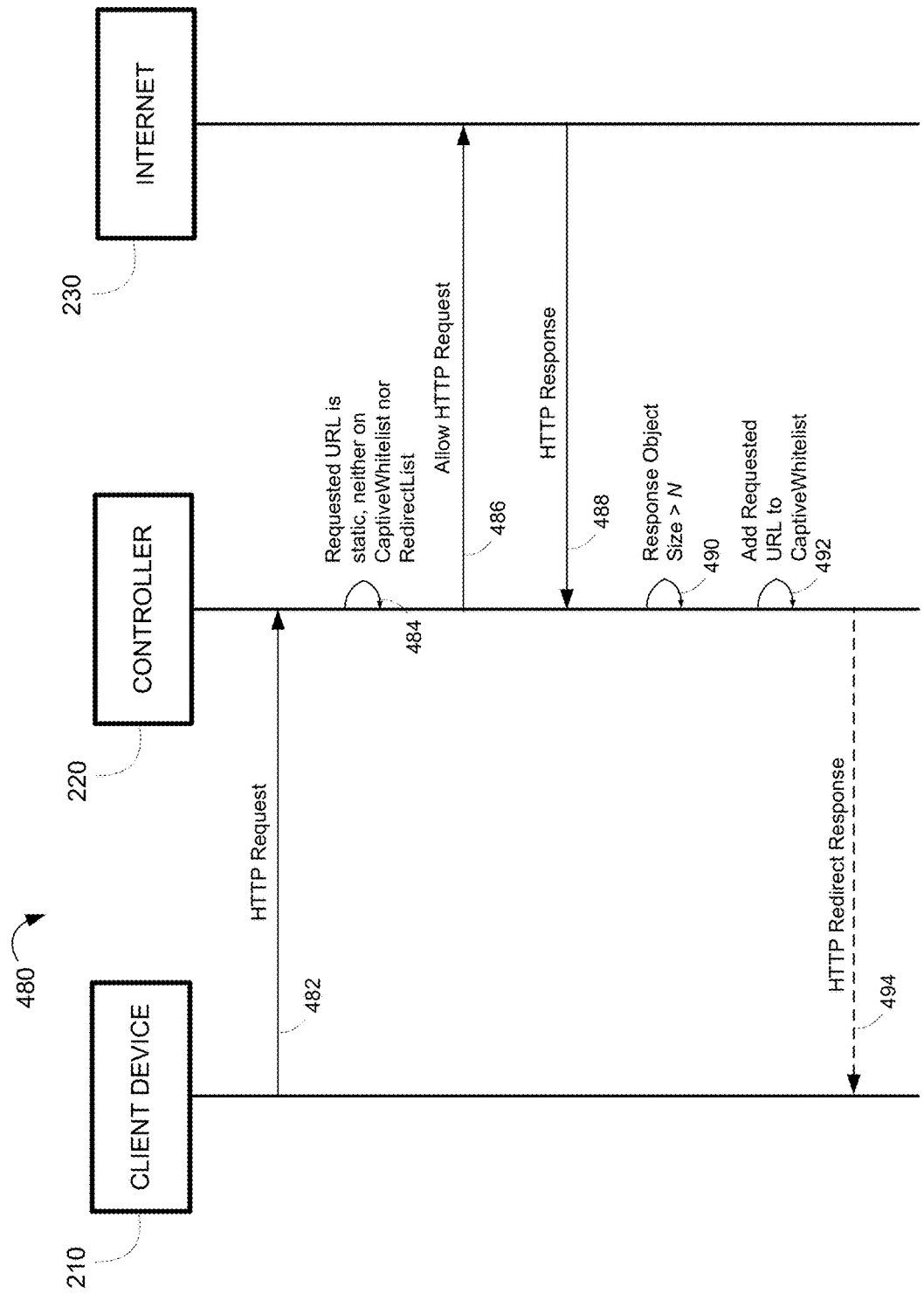

Moving finally to FIG. 4E, a signal diagram 480 depicts a fifth example scenario in which the client device 210 transmits an HTTP request, and the controller 220 receives the request (482). In this scenario, the controller 220 determines that the requested URL is a static URL, but is neither on the CaptiveWhitelist nor on the RedirectList (484). Effectively, as in the signal diagram 460 from FIG. 4D, the request may or may not be an HTTP captivity probe. Accordingly, the controller 220 allows the HTTP request through to its destination over the Internet 230 (486) and awaits an HTTP response from the destination.

Upon receiving the response (488), as in FIG. 4D, the controller 220 analyzes the response. Particularly, the controller 220 determines whether the size of the response (or the size of a particular portion thereof, e.g., the response message body) exceeds a threshold size N (e.g., 5 kB). In this scenario, the controller 220 determines that the response size exceeds N (490), and thus the original HTTP request was likely not a captivity probe. Accordingly, the controller 220 automatically causes the HTTP request URL to be added to the RedirectList (492), locally at the controller 220 and/or at another location over the Internet 230. Additionally, the controller may disconnect and/or block the HTTP response from the client device 210. In some embodiments, the controller 220 may transmit an HTTP redirect response to the client device 210, for example by redirecting the original HTTP request to the visitor service portal.

As a result of adding the original request URL to the RedirectList, any subsequent HTTP request to the same URL may be identified as not being an HTTP captivity probe. Accordingly, if the same client device 210 or another client device transmits a request to the same URL, actions of the signal diagram 440 from FIG. 4C may accordingly be carried out to redirect the subsequent HTTP request (e.g., to the visitor service portal).

The signal diagrams of FIGS. 4A-4E may include additional, fewer, and/or alternate actions, in some embodiments. For example, criteria for determining whether an HTTP request is an HTTP captivity probe (e.g., the size threshold N, the character count threshold, or criteria for identifying dynamic URLs) may vary, as attributes of new HTTP captivity probes become known. Moreover, in some embodiments, order of actions of the signal diagrams may vary from the order shown, where appropriate.

Figure 5:
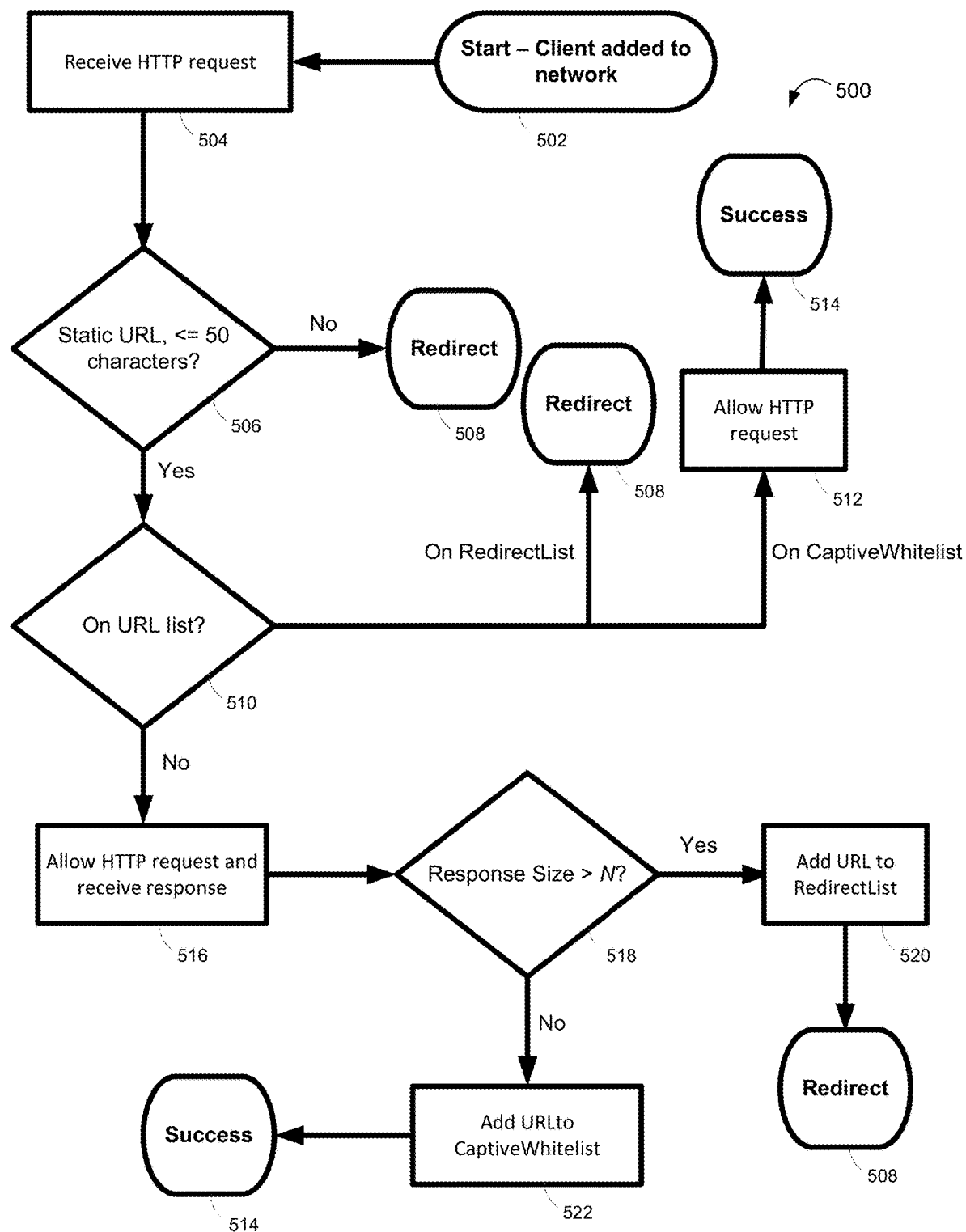
FIG. 5 depicts a flow diagram representative of an example process tree associated with handling HTTP request traffic from the client device, in accordance with some embodiments.

FIG. 5 depicts an example flow diagram 500, which consolidates actions depicted in FIGS. 4A-4E into a single illustration for the sake of simplicity. It should be understood that actions depicted in the flow diagram 500 may correspond to actions in the signal diagrams of FIGS. 4A-4E. In particular, actions of the flow diagram 500 may correspond to actions of a controller in a local environment in which a visitor-based communication service is provided (e.g., controller 220).

The flow diagram 500 starts upon a client device being added to a communication network of a local environment (502). The client device may, for example, be added to a wireless communication network in the cabin of an aircraft or in another environment, as shown in FIG. 2. An outgoing HTTP request from the client device is subsequently received (504) and the controller analyzes the HTTP request URL to determine if the HTTP request URL is a static URL having no more than 50 characters. If the URL fails either or both conditions, the controller may determine that the HTTP request was not an HTTP captivity probe, and the controller may transmit an HTTP redirect response to the client device (508). When the URL satisfies both conditions, the controller may determine whether the HTTP request URL is already included in either or both of the RedirectList or the CaptiveWhitelist. If the URL is in the RedirectList, the controller may transmit an HTTP redirect response to the client device (508). If the URL is in the CaptiveWhitelist, the controller may allow the HTTP request to its destination, and accordingly may relay an HTTP success response to the client device (514).

If the HTTP request URL is neither included in the RedirectList nor included in the CaptiveWhitelist, the controller may allow the HTTP request to pass to its destination, and await an HTTP response (516). Upon receiving the response, the controller may determine whether the size of the response (or the size of a particular portion thereof, e.g., the message body) exceeds the threshold size N (e.g., 5 kB). If the size exceeds N, the original HTTP request likely was not a probe, and thus the controller may add the HTTP request URL to the RedirectList (520) and transmit an HTTP redirect response to the client device. If the size does not exceed N, the originally HTTP request likely was a probe, and the controller may add the HTTP request URL to the CaptiveWhitelist (522), and may transmit an HTTP success response to the client device (514).

The method 500 may include additional, fewer, and/or alternate actions, in some embodiments. Moreover, in some embodiments, order of actions of the method 500 may vary from the order shown in FIG. 5, where appropriate.

Machine Learning Techniques for Identifying HTTP Captivity Probes

Criteria for identifying HTTP captivity probes, as described above, generally reflect observed characteristics of probes presently used by common electronic devices and operating systems. That is, known probes generally have a static URL of no greater than 50 characters, and return an HTTP response of a size no greater than 5 kB. Although not all presently used probes are known, it is expected that any presently used but unknown probes also generally follow these criteria, and thus, it is expected that similar criteria are suitable for applying the techniques described herein.

However, a problem emerges in that new HTTP captivity probes may be introduced in the future. In particular, new electronic devices and operating systems (developed and/or distributed after the date of this detailed description) may utilize new HTTP captivity probes that may not share the characteristics of presently known probes. For example, future probes may more often exceed 50 characters in length, or may return an HTTP response of a size greater than 5 kB.

It is desired that the techniques described herein be adaptive to HTTP captivity probes that are not presently known, including unknown but presently used probes, as well as probes introduced in the future. Thus, in some embodiments, automated machine learning techniques may be utilized to create and/or update URL lists, as well as to determine and/or modify the criteria utilized to distinguish HTTP captivity probes from similar HTTP requests that are not probes ("non-probes"). For example, based upon analysis of newly identified probes and/or non-probes, it may be determined that a different character count threshold more reliably distinguishes HTTP captivity probes from non-probes. As another example, it may be determined that a different return size threshold N more reliably distinguishes probes from non-probes. In still other examples, additional criteria (e.g., a characteristic of the HTTP request and/or characteristic of an HTTP response thereto) may be identified that reliably distinguish HTTP captivity probes from non-probe HTTP requests. Based on such learned knowledge, the machine learning techniques may be utilized to monitor and handle HTTP traffic from client devices according to the techniques described herein.

Various techniques may be utilized to develop a machine learning model to identify probes and monitor HTTP traffic. In some embodiments, the problem of identifying probes and non-probes may be addressed as a binary classification problem, and thus developing the machine learning model may include training a classification model to identify requests that are probes and requests that are not probes. Based upon training data including HTTP traffic (i.e., requests and/or responses) known to correspond to an HTTP captivity probe (or conversely, HTTP traffic known not to correspond HTTP captivity probes), one or more processors of a controller may be trained to identify HTTP probes and non-probes by identifying characteristics of the HTTP traffic that differentiate probes and non-probes. In some embodiments, such training data may be based upon the current CaptiveWhitelist and/or RedirectList, as these URL lists are representative of known probes and known non-probes. Classification models developed in accordance with the above may include the use of a linear classification algorithm (e.g., a naïve Bayes classification), a decision tree, and, an artificial neural network (e.g., comprising weighted nodes corresponding to characteristics of HTTP traffic), a support-vector machine, and/or another classification algorithm.

In any case, once trained, the one or more processors may receive HTTP traffic from client devices and/or internet destinations, and may analyze the HTTP traffic with respect to the developed machine learning model to determine whether the HTTP traffic does or does not correspond to an HTTP captivity probe. Upon such a determination, a trained controller may handle the HTTP traffic using the techniques described herein. For example, in accordance with FIGS. 4A-4E, the trained controller may cause URLs of newly discovered probes to be added to the CaptiveWhitelist, and may cause URLs of certain non-probe HTTP requests (e.g., URLs which resemble probe URLs but return responses not satisfying probe criteria) to be added to the Redirect List. The trained controller may accordingly allow and/or redirect HTTP requests from client devices in accordance with the protocols described herein.

Example Computer-Implemented Method

Figure 6:
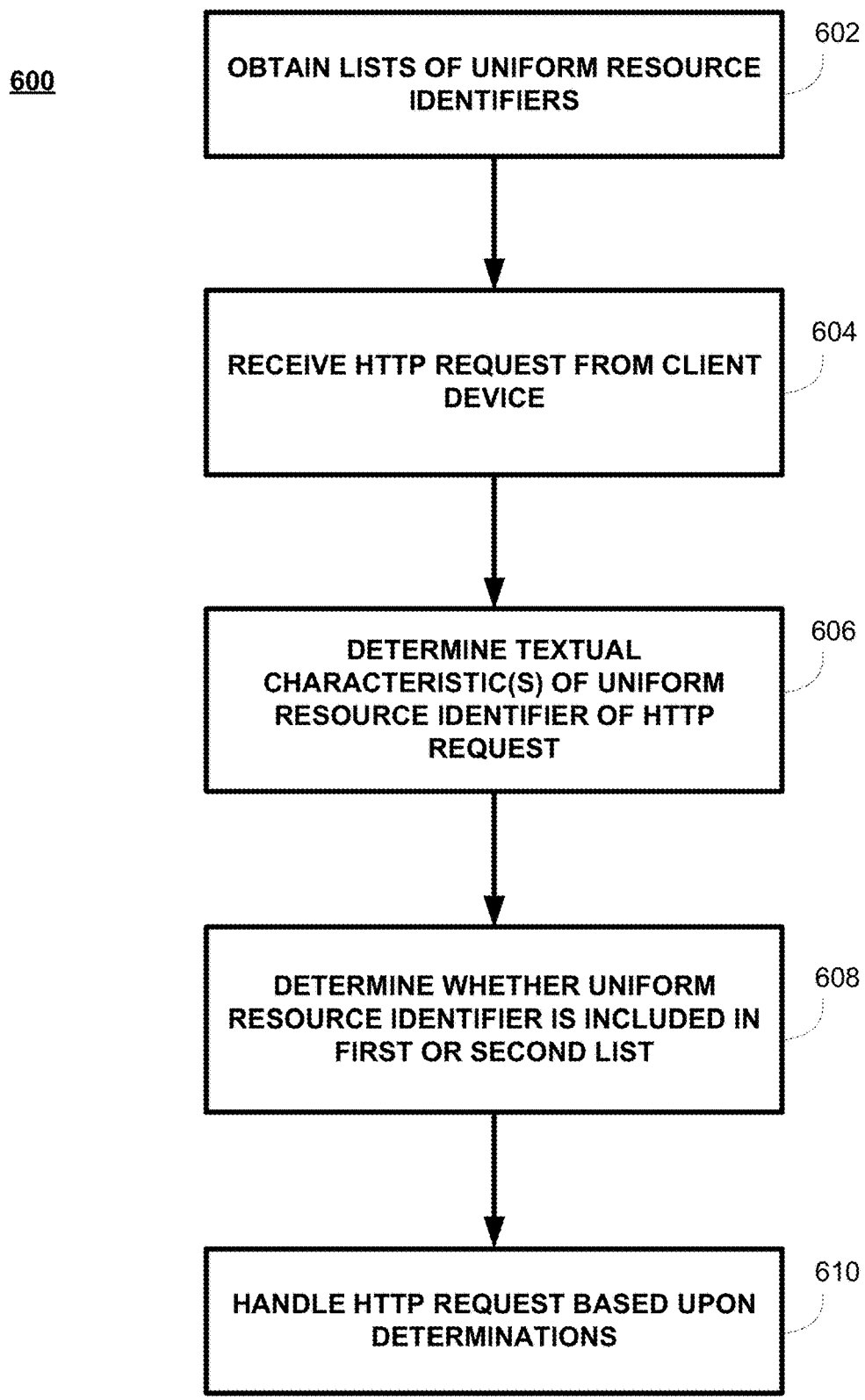
FIG. 6 depicts an example computer-implemented method in accordance with some embodiments.

FIG. 6 depicts an example computer-implemented method 600 associated with handling communications in a visitor-based communications service. The method 600 may be implemented, for example, via the computing environment described with respect to FIG. 1. In particular, the method 600 may be implemented via a controller configured to implement a visitor-based communication service in a wireless communication network disposed in a local environment (e.g., within an aircraft). In some embodiments, one or more non-transitory computer readable media may store computer-executable instructions that, when executed via one or more computer processors, cause a computer to perform actions of the method 600.

The method 600 includes obtaining first and second lists of uniform resource identifiers (602, e.g., lists of URLs). Each of one or more entries in the first list of uniform resource identifiers corresponds to an HTTP request that is an HTTP captivity probe utilize by client electronic devices to detect network captivity (e.g., the HTTP request includes the corresponding uniform resource identifier). Each of one or more entries in the second list of uniform resource identifiers corresponds to an HTTP request that is not a captivity probe, but which may exhibit characteristics similar to HTTP requests (e.g., having similar length and a static URL, but returning and HTTP response of a size that indicates that the HTTP request is not a captivity probe). Effectively, the first list of uniform resource identifiers may be referred to as the CaptiveWhitelist, and the second list of uniform resource identifiers may be referred to as the RedirectList, as discussed herein. In some embodiments, obtaining the lists may include satellite and/or ATG communications between an aircraft and a location external to the aircraft (e.g., a ground location storing "master" versions of the first and second lists, for distribution among one or more locations in which similar communications are implemented).

The method 600 additionally includes receiving, via a client electronic device over the wireless communication network, an HTTP request (604). The HTTP request includes a particular uniform resource identifier, identifying a destination of the request (e.g., a website). The HTTP request may originate, for example, from a browser application of the client device, or another application of the client device (e.g., an in-flight media application). As will be described herein, the HTTP request may or may not be an HTTP captivity probe typically utilized by the client electronic device to detect network captivity. Accordingly, subsequent steps of the method 600 may assist in determining whether the HTTP request is a captivity probe, to thereby handle the HTTP request to prevent automatic launching of a captive browser of the client device.

The method 600 includes determining one or more textual characteristics of the uniform resource identifier included in the HTTP request. (606). Determining the one or more textual characteristics may include, for example (1) determining whether the uniform resource identifier is a static URL or a dynamic URL (e.g., whether the URL includes PHP, query text, and/or special characters), and/or (2) determining whether the uniform resource identifier exceeds a predetermined character count threshold (e.g., 50 characters). In some embodiments, machine learning techniques may be utilized to identify one or more other textual characteristics which may be indicative of HTTP captivity probes, and accordingly, the method 600 may include determining other textual characteristics of the HTTP request that may distinguish HTTP captivity probes from non-probes.

The method 600 may include determining whether the uniform resource identifier is included in either of the first or second lists of uniform resource identifiers (608). Effectively, it may be determined whether the HTTP request is among a list of requests known to correspond to HTTP captivity probes, or known not to correspond to probes. In some embodiments, wherein the previous action 604 produces a determination that the HTTP request is a probe or is not a probe (e.g., the uniform resource identifier is a dynamic URL, whereas probes are typically static URLs), the action 606 may be omitted.

The method 600 includes handling the HTTP request based upon the determinations of the previous actions (610). In particular, the HTTP request may be handled as shown in FIGS. 4A-4E and FIG. 5. If the uniform resource identifier of the HTTP request is included in the first list (i.e., the HTTP request is a probe), the request may be allowed to its destination (e.g., the HTTP request message may be sent/forwarded from a controller to the destination). In some embodiments, an HTTP success response (e.g., 2xx response) may be returned from the destination to the client device. If the uniform resource identifier is included in the second list, (i.e., the HTTP request is not a probe), an HTTP redirection message (e.g., 3xx response) may be transmitted to the client device. The redirection message may, for example, redirect an application (e.g., browser) of the client device to a service portal of the visitor-based communication service (e.g., to a homepage or another whitelisted website/service of the visitor-based communication service).

If the uniform resource identifier is neither included in the first list nor the second list, the HTTP request may be allowed to its destination. In these cases, a response (responsive to the HTTP request) may be received via the destination. The size of the response may be determined. If the response (or, a particular portion thereof, e.g., message body) exceeds a predetermined size threshold (e.g., 5 kB) it may be determined that the HTTP request was not a probe. In this case, the uniform resource identifier of the HTTP request may be added to the second list of uniform resource identifiers. In some embodiments, the response may be disconnected from the client device, and instead a redirection message may be transmitted to the client device (e.g., redirection to the service portal). Alternatively, if the response does not exceed the predetermined size threshold, it may be determined that the HTTP request was a probe. In this case, the uniform resource identifier of the HTTP request may be added to the first list of uniform resource identifiers. In some embodiments, the response (e.g., a success response) may be provided to the client device.

The method 600 may include additional, fewer, and/or alternate actions. For example, actions of the method 600 may be performed in combination with other actions described in this detailed description with FIGS. 4A-4E and/or FIG. 5.

Additional Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still cooperate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

When implemented, any of the methods and techniques described herein or portions thereof may be performed by executing software stored in one or more non-transitory, tangible, computer readable storage media or memories such as magnetic disks, laser disks, optical discs, semiconductor memories, biological memories, other memory devices, or other storage media, in a RAM or ROM of a computer or processor, etc.

This detailed description is to be construed as examples and does not describe every possible embodiment, as describing every possible embodiment would be impractical, if not impossible. Numerous alternative embodiments could be implemented, using either current technology or technology developed after the filing date of this patent, which would still fall within the scope of the claims. By way of example, and not limitation, the disclosure herein contemplates at least the following aspects:

1. A computer-implemented method of providing a visitor-based communication service via a wireless communication network. The method comprises obtaining, via one or more processors, first and second lists of uniform resource identifiers, the first list of uniform resource identifiers corresponding to Hypertext Transfer Protocol (HTTP) requests that are captivity probes utilized by client electronic devices to detect network captivity, and the second list of uniform resource identifiers corresponding to HTTP requests that are not captivity probes; receiving, via the one or more processors, via a client electronic device over the wireless communication network, an HTTP request comprising a uniform resource identifier; determining, via the one or more processors, one or more textual characteristics of the uniform resource identifier; determining, via the one or more processors, whether the uniform resource identifier is included in the first or the second list of uniform resource identifiers; and based upon the one or more textual characteristics, and further based upon whether the resource uniform resource identifier is included in the first or second list of uniform resource identifiers, transmit, via the one or more processors, one or more messages to the client electronic device or to a destination via the Internet, the destination indicated by the HTTP request received via the client electronic device.

2. The method of the previous aspect, wherein determining the one or more textual characteristics comprises at least one of (1) determining that the uniform resource identifier is a dynamic uniform resource locator (URL), or (2) determining that the uniform resource identifier exceeds a predetermined character count threshold, and wherein transmitting the one or more messages comprises transmitting an HTTP redirect message to the client device, the redirect message redirecting an application of the client electronic device to a service portal of the visitor-based communication service.

3. The method of any one of the previous aspects, comprising, in response to determining that the uniform resource identifier is included in the first list of uniform resource identifiers, transmitting the one or more messages to the destination indicated by the HTTP request.

4. The method of any one of the previous aspects, comprising, in response to determining that the uniform resource identifier is included in the second list of uniform resource identifiers, transmitting the one or more messages to the client electronic device, the one or more messages comprising an HTTP redirection message redirecting an application of the client electronic device to a service portal of the visitor-based communication service.

5. The method of any one of the previous aspects, comprising: in response to determining that the uniform resource identifier is included in neither the first list nor the second list of uniform resource identifiers, transmitting the one or more messages to the destination indicated by the HTTP request; receiving a response message via the destination, the response message being responsive to the HTTP request; and in response to determining that the response message exceeds a predetermined size threshold, adding the uniform resource identifier of the HTTP request to the second list of uniform resource identifiers.

6. The method of any one of the previous aspects, comprising, in response to determining that the uniform resource identifier is included in neither the first list nor the second list of uniform resource identifiers, transmitting the one or more messages to the destination indicated by the HTTP request; receiving a response message via the destination, the response message being responsive to the HTTP request; and in response to determining that the response message does not exceed a predetermined size threshold, adding the uniform resource identifier of the HTTP request to the first list of uniform resource identifiers 7. The method of any one of the previous aspects, wherein the wireless communication network is implemented in a cabin of an aircraft.

8. The method of the previous aspect, wherein obtaining the first and second lists of uniform resource identifiers comprises obtaining the first and second lists of uniform resource identifiers from a location external to the aircraft via satellite or air-to-ground communications between the aircraft and the location external to the aircraft.

9. The method of any one of the previous aspects, comprising training, via one or more machine learning algorithms, the one or more processors to identify HTTP captivity probes based upon training data sets including the first and second lists of uniform resource identifiers, wherein training the one or more processors produces one or more criteria for identifying captivity probes, the one or more criteria being associated with HTTP requests or responses to HTTP requests.

10. A controller device configured to provide a visitor-based communication service in a wireless communication network. The controller device comprises one or more processors, and one or more memories storing non-transitory computer executable instructions. The computer-executable instructions, when executed via one or more processors, cause the controller device to obtain first and second lists of uniform resource identifiers, the first list of uniform resource identifiers corresponding to Hypertext Transfer Protocol (HTTP)

captivity probes utilized by client electronic devices to detect network captivity, and the second list of uniform resource identifiers corresponding to HTTP requests that are not HTTP captivity probes; receive, via a client electronic device over the wireless communication network, an HTTP request comprising a uniform resource identifier; determine one or more textual characteristics of the uniform resource identifier; determine whether the uniform resource identifier is included in the first or the second list of uniform resource identifiers; and based upon the one or more textual characteristics, and further based upon whether the resource uniform resource identifier is included in the first or second list of uniform resource identifiers, transmit one or more messages to the client electronic device or to a destination via the Internet, the destination indicated by the HTTP request received via the client electronic device.

11. The controller device of the previous aspect, configured to perform the actions of the method of any one of aspects 1-9.

12. The controller device of any one of aspects 10-11, wherein determining the one or more textual characteristics comprises at least one of (1) determining that the uniform resource identifier is a dynamic uniform resource locator (URL), or (2) determining that the uniform resource identifier exceeds a predetermined character count threshold; and wherein transmitting the one or more messages comprises transmitting an HTTP redirect message to the client device, the redirect message redirecting an application of the client electronic device to a service portal of the visitor-based communication service.

13. The controller device of any one of aspects 10-12, wherein the non-transitory computer executable instructions include instructions that, when executed via the one or more processors, cause the controller device to transmit the one or more messages to the destination indicated by the HTTP request, in response to determining that the uniform resource identifier is included in the first list of uniform resource identifiers.

14. The controller device of any one of aspects 10-13, wherein the non-transitory computer executable instructions include instructions that, when executed via the one or more processors, cause the controller device to transmit the one or more messages to the client electronic device in response to determining that the uniform resource identifier is included in the second list of uniform resource identifiers, the one or more messages comprising an HTTP redirection message redirecting an application of the client electronic device to a service portal of the visitor-based communication service.

15. The controller device of any one of aspects 10-14, wherein the non-transitory computer executable instructions include instructions that, when executed via the one or more processors, cause the controller device to: in response to determining that the uniform resource identifier is included in neither the first list nor the second list of uniform resource identifiers, transmit the one or more messages to the destination indicated by the HTTP request; receive a response message via the destination, the response message being responsive to the HTTP request; and in response to determining that the response message exceeds a predetermined size threshold, add the uniform resource identifier of the HTTP request to the second list of uniform resource identifiers.

16. The controller device of any one of aspects 10-15, wherein the non-transitory computer executable instructions include instructions that, when executed via the one or more processors, cause the controller device to: in response to determining that the uniform resource identifier is included in neither the first list nor the second list of uniform resource identifiers, transmit the one or more messages to the destination indicated by the HTTP request; receive a response message via the destination, the response message being responsive to the HTTP request; and in response to determining that the response message does not exceed a predetermined size threshold, add the uniform resource identifier of the HTTP request to the first list of uniform resource identifiers.

17. The controller device of any one of aspects 10-16, wherein the wireless communication network is implemented in a cabin of an aircraft.

18. The controller device of the previous aspect, wherein the instructions to obtain the first and second lists of uniform resource identifiers comprise instructions to obtain the first and second lists of uniform resource identifiers from a location external to the aircraft via satellite or air-to-ground communications between the aircraft and the location external to the aircraft.

19. The controller device of any one of aspects 10-18, wherein the non-transitory computer executable instructions include instructions that, when executed via the one or more processors, cause the controller device to: via one or more machine learning algorithms, train the one or more processors to identify HTTP captivity probes based upon training data sets including the first and second lists of uniform resource identifiers, wherein training the one or more processors produces one or more criteria for identifying captivity probes, the one or more criteria being associated with HTTP requests or responses to HTTP requests.

20. One or more non-transitory computer readable media storing non-transitory computer executable instructions that, when executed via the one or more processors, cause the one or more processors to: obtain first and second lists of uniform resource identifiers, the first list of uniform resource identifiers corresponding to Hypertext Transfer Protocol (HTTP) captivity probes utilized by client electronic devices to detect network captivity of the client electronic devices, and the second list of uniform resource identifiers corresponding to HTTP requests that are not HTTP captivity probes; receive, via a client electronic device over the wireless communication network, an HTTP request comprising a uniform resource identifier; determine one or more textual characteristics of the uniform resource identifier; determine whether the uniform resource identifier is included in the first or the second list of uniform resource identifiers; and based upon the one or more textual characteristics, and further based upon whether the resource uniform resource identifier is included in the first or second list of uniform resource identifiers, transmit one or more messages to the client electronic device or to a destination via the Internet, the destination indicated by the HTTP request received via the client electronic device.

21. The one or more non-transitory computer readable media of the previous aspect, wherein the non-transitory computer executable instructions, when executed via the one or more processors, cause the one or more processors to perform the actions of any one of the previous aspects.

22. Any one of the above aspects in combination with any other one of the above aspects.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

What is claimed is:

1. A computer-implemented method of providing a visitor-based communication service via a controller over a wireless communication network, the method comprising:
   obtaining, via one or more processors, first and second lists of uniform resource identifiers, the first list of uniform resource identifiers to be whitelisted by the controller of the visitor-based communication service, the first list of uniform resource identifiers corresponding to Hypertext Transfer Protocol (HTTP) requests that are captivity probes automatically transmitted by client electronic devices to detect network captivity, and the second list of uniform resource identifiers corresponding to HTTP requests that are not captivity probes;
   receiving, via the one or more processors, via a client electronic device over the wireless communication network, an HTTP request comprising a uniform resource identifier;
   determining, via the one or more processors, one or more textual characteristics of the received uniform resource identifier;
   determining, via the one or more processors, whether the received uniform resource identifier has been identified to be a captivity probe automatically transmitted by client electronic devices to detect network captivity by determining whether the received uniform resource identifier is included in the first or the second list of uniform resource identifiers;
   based upon the one or more textual characteristics, and in response to determining that the received uniform resource identifier is included in neither the first nor the second list of uniform resource identifiers, transmitting, via the one or more processors, one or more messages to a destination via the Internet, the destination being indicated by the HTTP request received via the client electronic device;
   receiving a response message to the HTTP request via the destination;
   determining whether the response message exceeds a predetermined size threshold; and
   based upon whether the response message exceeds the predetermined size threshold, (1) determining whether the received uniform resource identifier is or is not a captivity probe, and (2) adding the received uniform resource identifier to either the first or second list of uniform resource identifiers in accordance with whether the received uniform resource identifier is a captivity probe.

2. The computer-implemented method of claim 1, wherein determining the one or more textual characteristics comprises at least one of (1) determining whether the received uniform resource identifier is a dynamic uniform resource locator (URL), or (2) determining whether the received uniform resource identifier exceeds a predetermined character count threshold.

3. The computer-implemented method of claim 1, wherein the determining whether the response message exceeds the predetermined size threshold comprises determining that the response message exceeds the predetermined size threshold, wherein the determining whether the received uniform resource identifier is or is not a captivity probe comprises determining that the received uniform resource identifier is not a captivity probe, and wherein the adding the received uniform resource identifier to either the first or second list of uniform resource identifiers comprises adding the uniform resource identifier of the received HTTP request to the second list of uniform resource identifiers to indicate that the received uniform resource identifier is not a captivity probe automatically transmitted by client devices to detect network captivity.

4. The computer-implemented method of claim 1, wherein the determining whether the response message exceeds the predetermined size threshold comprises determining that the response message does not exceed the predetermined size threshold, wherein the determining whether the received uniform resource identifier is or is not a captivity probe comprises determining that the received uniform resource identifier is a captivity probe, and wherein the adding the received uniform resource identifier to either the first or second list of uniform resource identifiers comprises adding the uniform resource identifier of the received HTTP request to the first list of uniform resource identifiers to indicate that the received uniform resource identifier is a captivity probe automatically transmitted by client devices to detect network captivity.

5. The computer-implemented method of claim 1, wherein the wireless communication network is implemented in a cabin of an aircraft.

6. The computer-implemented method of claim 5, wherein obtaining the first and second lists of uniform resource identifiers comprises obtaining the first and second lists of uniform resource identifiers from a location external to the aircraft via satellite or air-to-ground communications between the aircraft and the location external to the aircraft.

7. The computer-implemented method of claim 1, comprising:
   training, via one or more machine learning algorithms, the one or more processors to identify whether uniform resource identifiers are HTTP captivity probes automatically transmitted by client devices to detect network captivity based upon training data sets including the first and second lists of uniform resource identifiers, wherein training the one or more processors produces one or more criteria for identifying whether uniform resource identifiers are HTTP captivity probes, the one or more criteria being associated with at least one of HTTP requests or responses to HTTP requests from destinations of the respective HTTP requests.

8. A controller device configured to provide a visitor-based communication service in a wireless communication network, the controller device comprising:
   one or more processors; and
   one or more memories storing non-transitory computer executable instructions that, when executed via the one or more processors, cause the controller device to:
   obtain first and second lists of uniform resource identifiers, the first list of uniform resource identifiers to be whitelisted by the controller device of the visitor-based communication service, the first list of uniform resource identifiers corresponding to Hypertext Transfer Protocol (HTTP) requests that are captivity probes automatically transmitted by client electronic devices to detect network captivity, and the second list of uniform resource identifiers corresponding to HTTP requests that are not HTTP captivity probes;

receive, via a client electronic device over the wireless communication network, an HTTP request comprising a uniform resource identifier;

determine one or more textual characteristics of the received uniform resource identifier;

determine whether the received uniform resource identifier has been identified to be a captivity probe automatically transmitted by client electronic devices to detect network captivity by determining whether the received uniform resource identifier is included in the first or the second list of uniform resource identifiers; and based upon the one or more textual characteristics, and in response to determining that the received uniform resource identifier is included in neither the first nor the second list of uniform resource identifiers, transmit one or more messages to a destination via the Internet, the destination being indicated by the HTTP request received via the client electronic device;

receive a response message to the HTTP request via the destination;

determine whether the response message exceeds a predetermined size threshold; and based upon whether the response message exceeds the predetermined size threshold, (1) determine whether the received uniform resource identifier is or is not a captivity probe, and (2) add the received uniform resource identifier to either the first or second list of uniform resource identifiers in accordance with whether the received uniform resource identifier is a captivity probe.

9. The controller device of claim 8, wherein determining the one or more textual characteristics comprises at least one of (1) determining whether the received uniform resource identifier is a dynamic uniform resource locator (URL), or (2) determining whether the received uniform resource identifier exceeds a predetermined character count threshold.

10. The controller device of claim 8,
wherein the determining whether the response message exceeds the predetermined size threshold comprises determining that the response message exceeds a predetermined size threshold, wherein the instructions to determine whether the received uniform resource identifier is or is not a captivity probe comprise instructions to determine that the received uniform resource identifier is not a captivity probe based upon the response message exceeding the predetermined size threshold, and wherein the instructions to add the received uniform resource identifier to either the first or second list of uniform resource identifiers comprise instructions to add the uniform resource identifier of the received HTTP request to the second list of uniform resource identifiers to indicate that the received uniform resource identifier is not a captivity probe automatically transmitted by client devices to detect network captivity.

11. The controller device of claim 8,
wherein the determining whether the response message exceeds the predetermined size threshold comprises determining that the response message does not exceed a predetermined size threshold, wherein the instructions to determine whether the received uniform resource identifier is or is not a captivity probe comprise instructions to determine that the received uniform resource identifier is a captivity probe based upon the response message not exceeding the predetermined size threshold, and wherein the instructions to add the received uniform resource identifier to either the first or second list of uniform resource identifiers comprise instructions to add the uniform resource identifier of the received HTTP request to the first list of uniform resource identifiers to indicate that the received uniform resource identifier is a captivity probe automatically transmitted by client devices to detect network captivity.

12. The controller device of claim 8, wherein the wireless communication network is implemented in a cabin of an aircraft.

13. The controller device of claim 12, wherein the instructions to obtain the first and second lists of uniform resource identifiers comprise instructions to obtain the first and second lists of uniform resource identifiers from a location external to the aircraft via satellite or air-to-ground communications between the aircraft and the location external to the aircraft.

14. The controller device of claim 8, wherein the non-transitory computer executable instructions include instructions that, when executed via the one or more processors, cause the controller device to:

via one or more machine learning algorithms, train the one or more processors to identify whether uniform resource identifiers are HTTP captivity probes automatically transmitted by client devices to detect network captivity based upon training data sets including the first and second lists of uniform resource identifiers, wherein training the one or more processors produces one or more criteria for identifying whether uniform resource identifiers are HTTP captivity probes, the one or more criteria being associated with at least one of HTTP requests or responses to HTTP requests from destinations of the respective HTTP requests.

15. One or more non-transitory computer readable media storing non-transitory computer executable instructions that, when executed via the one or more processors of a controller device providing a visitor-based communication service in a wireless communication network, cause the one or more processors to:

obtain first and second lists of uniform resource identifiers, the first list of uniform resource identifiers to be whitelisted by the controller device of the visitor-based communication service, the first list of uniform resource identifiers corresponding to Hypertext Transfer Protocol (HTTP) requests are captivity probes automatically transmitted by client electronic devices to detect network captivity of the client electronic devices, and the second list of uniform resource identifiers corresponding to HTTP requests that are not HTTP captivity probes;

receive, via a client electronic device over the wireless communication network, an HTTP request comprising a uniform resource identifier;

determine one or more textual characteristics of the received uniform resource identifier;

determine whether the received uniform resource identifier has been identified to be a captivity probe automatically transmitted by client electronic devices to detect network captivity by determining whether the received uniform resource identifier is included in the first or the second list of uniform resource identifiers; and based upon the one or more textual characteristics, and in response to determining that the received uniform resource identifier is included in neither the first nor the second list of uniform resource identifiers, transmit one or more messages to a destination via the Internet, the destination being indicated by the HTTP request received via the client electronic device;

receive a response message to the HTTP request via the destination;

determine whether the response message exceeds a predetermined size threshold; and based upon whether the response message exceeds the predetermined size threshold, (1) determine whether the received uniform resource identifier is or is not a captivity probe, and (2) add the received uniform resource identifier to either the first or second list of uniform resource identifiers in accordance with whether the received uniform resource identifier is a captivity probe.

16. The one or more non-transitory computer readable media of claim 15, wherein the one or more processors of the controller device are aboard an aircraft, the controller device operating to implement the visitor-based communication service via the wireless communication network aboard the aircraft.

* * * * *